(12) United States Patent
Dingle

(10) Patent No.: US 7,900,605 B2
(45) Date of Patent: Mar. 8, 2011

(54) FUEL INJECTOR AND METHOD FOR CONTROLLING FUEL INJECTORS

(75) Inventor: Philip J. G. Dingle, Rochester, MI (US)

(73) Assignee: Delphi Technologies Holding S.arl, Troy, MI (US)

( * ) Notice: Subject to any disclaimer, the term of this patent is extended or adjusted under 35 U.S.C. 154(b) by 0 days.

(21) Appl. No.: 12/470,058

(22) Filed: May 21, 2009

(65) Prior Publication Data
US 2009/0223487 A1 Sep. 10, 2009

Related U.S. Application Data

(62) Division of application No. 11/890,737, filed on Aug. 7, 2007, now Pat. No. 7,552,717.

(51) Int. Cl.
*F02M 63/00* (2006.01)
*F02D 41/30* (2006.01)
(52) U.S. Cl. .................. 123/480; 123/447; 701/103
(58) Field of Classification Search .................. 123/276,
123/299, 300, 305, 479, 480, 490; 239/533.2,
239/533.3; 701/103
See application file for complete search history.

(56) References Cited

U.S. PATENT DOCUMENTS

| | | | |
|---|---|---|---|
| 4,438,496 A | | 3/1984 | Ohie |
| 5,445,019 A | * | 8/1995 | Glidewell et al. .......... 73/114.51 |
| 5,535,621 A | * | 7/1996 | Glidewell et al. .......... 73/114.49 |
| 5,899,194 A | * | 5/1999 | Iwatsuki et al. ............. 123/527 |
| 5,975,056 A | * | 11/1999 | Augustin et al. ............. 123/478 |
| 6,085,727 A | | 7/2000 | Nakano |
| 6,216,664 B1 | * | 4/2001 | Bochum et al. ............... 123/305 |
| 6,345,606 B1 | | 2/2002 | Ricci-Ottati et al. |
| 6,349,702 B1 | * | 2/2002 | Nishiyama .................... 123/456 |
| 6,363,314 B1 | * | 3/2002 | Hafner et al. ................. 701/104 |
| 6,405,709 B1 | * | 6/2002 | Carroll et al. ................. 123/456 |
| 6,425,879 B1 | | 7/2002 | Egger et al. |
| 6,480,781 B1 | * | 11/2002 | Hafner et al. ................. 701/104 |
| 6,497,223 B1 | | 12/2002 | Tuken et al. |

(Continued)

FOREIGN PATENT DOCUMENTS
EP 1424480 6/2004
(Continued)

OTHER PUBLICATIONS

International Search Report dated Jul. 27, 2009.

*Primary Examiner* — Stephen K Cronin
*Assistant Examiner* — Johnny H Hoang
(74) *Attorney, Agent, or Firm* — Jimmy L. Funke

(57) ABSTRACT

A fuel injector for an internal combustion engine, the fuel injector comprising an injector body, a fuel supply passage defined in the injector body, the fuel supply passage containing fuel under high pressure in use of the injector, a pressure sensor for measuring the pressure of fuel in the passage in use, wherein the pressure sensor is situated within the injector body and is separated from fuel in the passage in use, and a method of fuel injection, comprising constructing an hydraulic behavior profile by fuel pressure measurement, using the hydraulic behavior profile to predict fuel pressure that will prevail in a fuel injector during an injection event, and supplying a control signal to the fuel injector to control the amount of fuel injected during the injection event in accordance with the predicted fuel pressure. By predicting the fuel pressure that will prevail during an injection event, the fuel delivered during the injection event can be accurately controlled.

7 Claims, 14 Drawing Sheets

U.S. PATENT DOCUMENTS

| | | |
|---|---|---|
| 6,598,591 B2 | 7/2003 | Lewis |
| 6,622,549 B1 | 9/2003 | Wlodarczyk et al. |
| 6,705,278 B2 * | 3/2004 | McGee et al. ............... 123/299 |
| 6,722,345 B2 * | 4/2004 | Saeki et al. ................. 123/435 |
| 6,786,201 B2 * | 9/2004 | Ohtani ......................... 123/431 |
| 6,848,414 B2 * | 2/2005 | West et al. .................. 123/299 |
| 6,850,835 B1 * | 2/2005 | Barnes et al. ................ 701/114 |
| 6,928,986 B2 * | 8/2005 | Niethammer et al. ....... 123/467 |
| 6,971,368 B2 * | 12/2005 | Uchiyama .................... 123/359 |
| 7,007,676 B1 * | 3/2006 | Schuricht et al. ............ 123/479 |
| 7,021,278 B2 * | 4/2006 | Ishizuka et al. .............. 123/299 |
| 7,080,550 B1 * | 7/2006 | Goris et al. ................. 73/114.48 |
| 7,269,500 B2 * | 9/2007 | Cochet et al. ................ 701/114 |
| 7,318,414 B2 * | 1/2008 | Hou .............................. 123/458 |
| 7,343,809 B2 | 3/2008 | Baumann et al. |
| 7,464,689 B2 * | 12/2008 | Siewert ........................ 123/299 |
| 7,497,076 B2 * | 3/2009 | Funk et al. .................... 60/286 |
| 7,523,743 B1 * | 4/2009 | Geveci et al. ................ 123/486 |
| 7,558,665 B1 * | 7/2009 | Geveci et al. ................ 701/104 |
| 7,717,088 B2 * | 5/2010 | Thomas ........................ 123/478 |
| 7,720,593 B2 * | 5/2010 | Yi et al. ........................ 701/105 |
| 2001/0020467 A1 * | 9/2001 | Coldren et al. ............... 123/511 |
| 2002/0124828 A1 * | 9/2002 | Shirakawa .................... 123/299 |
| 2003/0106531 A1 * | 6/2003 | Saeki et al. ................... 123/435 |
| 2003/0111049 A1 | 6/2003 | Lewis |
| 2003/0121501 A1 | 7/2003 | Barnes et al. |
| 2006/0243243 A1 * | 11/2006 | Fukasawa ..................... 123/299 |
| 2009/0084348 A1 * | 4/2009 | Batenburg et al. ........... 123/294 |
| 2009/0277258 A1 * | 11/2009 | Cueto ......................... 73/114.48 |

FOREIGN PATENT DOCUMENTS

| | | |
|---|---|---|
| EP | 1854993 | 11/2007 |

* cited by examiner

FUEL INJECTOR AND METHOD FOR CONTROLLING FUEL INJECTORS

CROSS REFERENCE TO RELATED APPLICATIONS

This application is a divisional application of U.S. Ser. No. 11/890,737, filed Aug. 7, 2007, entitled "FUEL INJECTOR AND METHOD FOR CONTROLLING FUEL INJECTORS".

TECHNICAL FIELD

This invention relates to fuel injectors for internal combustion engines, and methods for controlling the quantity of fuel delivered by fuel injectors. In particular, the invention concerns the determination or prediction of the pressure of fuel in a fuel injector over the course of a fuel injection event.

BACKGROUND OF THE INVENTION

Fuel injection systems allow control and optimization of the quantity of fuel injected into the combustion chambers of an engine, the timing of fuel delivery with respect to the crankshaft and piston position, and the presentation of fuel to the combustion chamber, for example by atomising and dispersing the fuel in a pre-determined pattern. Modern fuel injection systems use electronic controls to achieve a high level of precision in the quantity and timing of the fuel delivery. This high precision is required to meet emissions and performance expectations of the marketplace.

Common rail fuel injection systems are well known, particularly in the field of compression ignition engines such as diesel engines. A typical common rail fuel injection system for an automobile is shown schematically in FIG. 1 of the accompanying drawings. Fuel is stored in a fuel tank 20, and is drawn by way of a lift pump 22 and a filter 24 to an engine-driven high-pressure pump 26. The high-pressure pump 26 supplies fuel at elevated pressure to an accumulator or rail 28. Fuel injectors 30 are connected to the rail by respective jumper pipes 32. Each fuel injector 30 is arranged to supply fuel to one respective cylinder of the engine by injecting the fuel into a combustion chamber of the cylinder under the control of an electronic control unit (ECU) 34.

Many types of fuel injector are known. In a typical arrangement, a fuel injector includes a control valve comprising a valve needle moveable between a first position and a second position upon actuation of an actuator, for example a solenoid or a piezoelectric actuator. The valve needle is accommodated within a body of the fuel injector. The body defines a nozzle provided with at least one orifice downstream of a seating surface for the valve needle. The seating surface, in turn, lies downstream of a reservoir of fuel at high pressure. In the first position, the valve needle seals against the seating surface, so as to prevent flow of fuel past the seating surface. In the second position, the valve needle is held away from the seating surface, so that fuel can flow from the reservoir, through the or each orifice and into the combustion chamber, thus effecting an injection of fuel.

The quantity of fuel delivered to the combustion chambers affects the torque output of the engine. Consequently, fuel delivery must be carefully controlled to provide the desired torque output at any given time under the conditions then prevailing.

The quantity of fuel delivered over the course of each injection event is a function of the nozzle orifice flow area, the fuel pressure and the injection duration. The injection duration is the time over which the needle is lifted from the seating surface, so that high-pressure fuel can flow into the combustion chamber through the orifice.

In a given fuel injector, the nozzle orifice flow area is fixed. Fuel delivery is therefore controlled using the so-called 'pressure-time' principle. To achieve delivery of a desired quantity of fuel, the injection duration is set electronically to a value which has been pre-calculated so that, assuming a certain fuel pressure, the required quantity of fuel will pass into the combustion chamber over the time that the fuel can flow through the nozzle, i.e. the injection duration. Consequently, any unintended variation in the fuel pressure may result in an incorrect quantity of fuel being delivered to the combustion chamber, with the result that the engine produces an output torque which is more or less than required. In these circumstances, the driveability, performance and emissions of the vehicle may be compromised.

Referring again to FIG. 1, control of the injection timing and duration is achieved by the ECU 34. The ECU 34 accepts input signals from a variety of sensors, which may include a crankshaft speed sensor 36a, a crankshaft phase sensor 36b, a throttle pedal demand sensor 36c, an air intake temperature sensor 36d, a coolant temperature sensor 36e, an air intake mass flow sensor 36f, and, in turbocharged engines, an intake boost pressure sensor 36g. In addition, common rail fuel injection systems include a fuel rail pressure sensor 38, which may be combined with a fuel temperature sensor. The ECU 34 controls, by way of output signals, various actuators which actuate a metering flow valve 40 at the inlet of the high-pressure pump 26, a rail pressure control valve 42, and control valves of the individual injectors 30.

The rail pressure sensor 38 is typically a piezo-resistive device with integrated electronics. It is installed intrusively in the rail 28, so that a portion of the sensor body, typically a diaphragm, is directly exposed to the high-pressure fuel in the rail 28. Generally, the rail pressure sensor 38 is screwed into a threaded port 44 in the rail 28, and a soft iron washer may be used to effect a seal between the sensor 38 and the rail 28. As rail pressure sensors 38 must operate reliably and without leakage in a very high-pressure environment, such sensors 38 are relatively expensive and delicate.

The nominal fuel pressure in the rail 28, and hence in each fuel injector 30, is determined by the ECU 34 using the input signals from the sensors 36a-36g, 38 to determine the engine operating conditions and the torque requirement. For example, at low engine speeds and low loads, the nominal rail pressure may be 300 bar; while at high engine speeds and high loads the nominal rail pressure may be 2000 bar. Typically, a range of optimum nominal rail pressures is recorded for a corresponding range of conditions in a calibration procedure during engine set-up and testing. The optimised values are determined so as to minimise emissions, optimise performance, or minimise fuel consumption as required. These optimised nominal pressures are stored in a map in a memory of the ECU 34 so that the optimised value for a given engine condition can be retrieved.

Under a given set of engine conditions, therefore, the nominal mean rail fuel pressure has a fixed value. The ECU 34 determines the actual, instantaneous rail fuel pressure from the rail pressure sensor 38, and operates the inlet metering flow valve 40 of the high-pressure fuel pump 26 or the rail pressure control valve 42 as appropriate to achieve and maintain the desired mean rail fuel pressure. In this way, a feedback control system is provided. Sophisticated control algorithms are provided to optimise this feedback control system. It is important that the rail pressure sensor is as accurate as possible because unexpected variations in rail fuel pressure will cause unexpected variations in torque output.

The response time of the feedback control system is limited by the performance of the rail pressure sensor 38, the ECU 34, the high-pressure pump 26 and the inlet metering flow valve 40 or the rail pressure control valve 42. For example, if the rail pressure drops, the rail pressure sensor 38 must respond to the pressure drop by sending an appropriate signal to the ECU 34, the ECU 34 must then evaluate the signal and respond by actuating the inlet metering flow valve 40, and within the constraints of its flow capacity, the high-pressure pump 26 must increase the rail pressure to the required value.

An injection event places an instantaneous flow demand on the fuel volume stored in the rail 28. The instantaneous flow demand is such that the control system cannot respond rapidly enough and, as a consequence, the fuel pressure in the rail 28 drops. The fuel pressure in the rail 28 is therefore perturbed, and a short time elapses before the pressure recovers to the desired level, although this recovery is hopefully complete before the next injection event. The drop in pressure means that, over the duration of a normal injection event, the mean pressure in the rail 28 may be slightly below the target pressure, but this effect can be accounted for during calibration so that the anticipated torque is still achieved.

Recent developments in fuel injection technology, and of common rail systems in particular, have introduced the capability of delivering fuel in multiple injection events per combustion cycle. In other words, instead of a single injection event occurring during each cycle of the cylinder, the fuel is delivered in a sequence, or train, of two or more precisely timed injection events, each of which injects a carefully controlled quantity of fuel. For example, an injection sequence may comprise a pilot injection or pre-injection, which preheats the gases in the combustion chamber ahead of a main injection in which the majority of the fuel is injected. A post injection, after the main injection, may also be provided to encourage complete combustion of unburnt fuel, thus reducing harmful exhaust emissions and improving fuel efficiency.

Modern engines, therefore, may utilise multiple injection events per cycle to optimise performance and fuel efficiency and to reduce harmful exhaust emissions. Over a range of engine load and speed conditions, the optimum injection sequence may change. For example, some conditions may require a pilot injection closely followed by a main injection, some conditions may require a split main injection, other conditions may require pilot, main and post injections, while still other conditions may require multiple pilot or multiple post injections.

When sequences of multiple injection events are required, the possibility arises that a perturbation to the rail pressure, and hence to the fuel pressure in the injectors 30, caused by a prior injection event may still be present when a subsequent injection event begins. In other words, the pressure wave within the fuel system that results from the prior injection event may not have died away when the subsequent injection event occurs. Consequently, the fuel pressure in the injector 30 at the time of the subsequent injection event is not at the expected level, corresponding to the target rail pressure. Instead, the pressure in the injector 30 is lower or higher than the expected pressure, depending on the phase relationship of the pressure wave to the subsequent injection event. In either case, the result is that an incorrect, unpredicted and unpredictable quantity of fuel is delivered, with similarly unpredictable consequences for torque output and emissions.

Significant errors in the fuel quantity delivered can arise because of this phenomenon, and these errors can result in unacceptable emissions, increased noise, impaired driveability, poor performance and so on.

One known approach to reduce or mitigate the undesired effects of these residual pressure waves involves providing tuning orifices at particular locations in the fuel system to damp the pressure waves resulting from injection events, thus impeding propagation of the waves. However, this approach is inflexible because the tuning orifices are effective only over a relatively limited range of engine conditions and injection sequences. In particular, this approach is of limited value where more than one injection strategy is employed in a given engine.

The effects of pressure waves in multiple-injection sequences could, in theory, be compensated for by mapping the entire speed and load regime of the engine with fine granularity and calibrating the injection durations in the sequence to compensate for residual pressure waves. However, this approach is impractical because it would require an extremely laborious calibration procedure, as well as the storage and rapid retrieval of a huge amount of data by the ECU. Furthermore, the calibrated injection durations would be sensitive to minor changes in pipe lengths and build tolerances.

It is against this background that the present invention has been devised.

SUMMARY OF THE INVENTION

According to a first aspect of the present invention, there is provided a fuel injector for an internal combustion engine, the fuel injector comprising an injector body, a fuel supply passage defined in the injector body, the fuel supply passage containing fuel under high pressure in use of the injector, and a pressure sensor for measuring the pressure of fuel in the passage in use, wherein the pressure sensor is situated within the injector body and is separated from fuel in the passage in use. For example, the supply passage may be at least partially defined by a wall of the injector body, so that the pressure sensor is separated from the fuel in the passage by the wall.

The pressure sensor may measure a strain experienced by the injector body, which arises from and relates to the pressure of fuel in the passage in use of the injector. In this context, the pressure sensor may comprise a strain gauge. It is also possible that the pressure sensor is responsive to a displacement, deflection or deformation of all or part of the injector body, caused by and corresponding to the pressure within the fuel supply passage.

Unlike a conventional 'intrusive' pressure sensor, such as a rail pressure sensor, the pressure sensor provided in the fuel injector of the present invention does not intrude into the passage, and no part of the pressure sensor need be wetted by the fuel within the passage. Thus the pressure sensor provided in the invention can be considered a 'non-intrusive' or 'dry' pressure sensor.

The present invention also offers advantages when compared to providing intrusive pressure sensors in individual injectors. According to the invention, the pressure sensor is separated from the supply passage, so there is no need for a precision-machined bore or breach in the supply passage within the injector. Such a bore would be expensive to fabricate and would provide a site for potential leakage or mechanical failure. Furthermore, the pressure sensor is not subject to the high-pressure environment of the supply passage. This reduces the risk of mechanical failure of the sensor, and because the sensor need not be engineered to resist high pressures, the cost of the sensor can be minimised. Similarly, because the sensor need not be leak-proof, the design of the pressure sensor can be relatively straightforward, resulting in a robust and low cost device. For example, high-pressure seals are not required.

The injector body may define a pressure sensor cavity to accommodate the pressure sensor, the pressure sensor cavity being separated from the passage. In one variant, the pressure sensor cavity accommodates electrical connections for an actuator of the injector. In this way, the pressure sensor and its associated electrical connections or harness can be integrated into an electrical connector, or header, for the actuator. The injector body may further define an actuator cavity and the pressure sensor cavity may communicate with the actuator cavity.

The pressure sensor cavity may extend inwardly from a side of the injector or inwardly from an end of the injector. The pressure sensor cavity may accommodate an electronic module in electrical communication with the pressure sensor.

The pressure sensor may be provided in any suitable location within the injector body. In one arrangement, the fuel supply passage and the pressure sensor define respective central longitudinal axes that substantially intersect. In another example, the fuel supply passage includes a portion of enlarged cross-sectional area and the pressure sensor is aligned with that portion of the fuel supply passage.

In one embodiment, the injector body defines an outer wall and an inner wall opposed to the outer wall about the fuel supply passage, and the pressure sensor is separated from fuel in the passage in use by the inner wall. Optionally, a face of the pressure sensor extends parallel to a wall of the supply passage.

The injector may be elongate to define a longitudinal axis, and the pressure sensor may cooperate with a wall of the supply passage that extends substantially parallel to the longitudinal axis of the injector. Alternatively, an elongate injector may include a pressure sensor which cooperates with a wall of the supply passage that extends across the longitudinal axis of the injector.

To optimise the response of the pressure sensor, a face of the pressure sensor may abut a wall which defines the supply passage. To this end, the injector may comprise a clamping element to press the face against the wall. For example, the injector body may define a port and the clamping element may be a plug in threaded engagement with the injector body within the port.

When a clamping element is provided, electrical connections for the pressure sensor may be accommodated within the clamping element. Similarly, an electronic module in electrical communication with the pressure sensor may be accommodated within the clamping element.

Any suitable pressure sensor may be used. The pressure sensor may, for example, comprise a magnetostrictive pressure sensor having a core of magnetostrictive material. In one embodiment, the pressure sensor comprises a core being a body of revolution with a generally I-shaped cross-section, and the core may be magnetostrictive. The pressure sensor may comprise a core that is integral with the injector body, in which case the pressure sensor may be responsive to changes in strain within the core.

In another aspect, the invention extends to a method of calibrating a fuel injector according to the first aspect of the invention and having a pressure sensor, the method comprising measuring an output value of the pressure sensor, and determining the pressure of a fluid in the supply passage corresponding to the output value. The fluid may, for example, be a gas such as air, or a liquid such as oil or fuel. The method may include measuring a plurality of output values of the pressure sensor, and determining, for each one of the plurality of output values, a corresponding pressure of fluid in the supply passage. In this way, a calibration curve for the pressure sensor can be obtained.

The injector may be calibrated after manufacture but before installation in an engine. For calibration purposes, the supply passage may be supplied with fluid at a known pressure or in a sequence of known pressures. The pressure of fluid corresponding to the output value as a sensor characteristic of the injector may be recorded, and the sensor characteristic may be encoded, for example in a machine-readable data format such as a barcode, or as an alphanumeric code for reading by a human operator.

The invention also extends to a method of programming a control unit of an engine including a fuel injector according to the first aspect of the invention and having a pressure sensor, the method comprising calibrating the fuel injector as previously described, and inputting the recorded sensor characteristic to the control unit, for example by reading an encoded sensor characteristic.

In another aspect, the invention resides in a fuel injection system for an internal combustion engine, the system comprising a plurality of fuel injectors, each in accordance with the first aspect of the invention, and having a pressure sensor, an accumulator arranged to supply fuel to the fuel injectors in use and a control unit arranged to receive pressure signals from the pressure sensors of the fuel injectors and to supply control signals to the fuel injectors to control the injection of fuel.

A rail fuel pressure sensor need not be provided, so avoiding the costs of the rail pressure sensor itself, and of providing a precision-machined bore in the fuel rail for mounting the rail pressure sensor. Furthermore, by eliminating the breach in the fuel rail required to accept the sensor, the risk of fuel leakage and mechanical failure at this site is avoided.

The fuel injection system may include a pump for pressurizing fuel in the accumulator, and an accumulator pressure control valve for controlling fuel pressure in the accumulator. Both the pump and the pressure control valve are under the control of the control unit. In this way, the pressure sensor, the pump, the pressure control valve and the control unit can, in combination, control the pressure of fuel in the accumulator.

By providing a fuel pressure sensor within each injector, measured values of the fuel pressure in each injector can be obtained and input to the control unit or ECU. The ECU can use these measured injector fuel pressure values to calculate the injection duration for each injection event, rather than relying on an estimated injector fuel pressure based on measured values of the rail fuel pressure remote from the injector as in conventional systems. In this way, the quantity of fuel delivered in an injection event can be more accurately predicted and controlled.

Accordingly, the control unit may be arranged to receive pressure signals from the pressure sensors to construct an hydraulic behaviour profile, to predict, using the hydraulic behaviour profile, the fuel pressures that will prevail in the injectors during injection events, and to supply control signals to the fuel injectors to control the amount of fuel injected during those injection events in accordance with the predicted fuel pressures.

To this end, the control unit may comprise a processor programmed repeatedly to sample the pressure signals from the pressure sensors to construct the hydraulic behaviour profile. In one variant, the control unit comprises a memory for storing an hydraulic behaviour model and a processor programmed to apply the hydraulic behaviour profile to the stored model to predict the fuel pressures that will prevail in the injectors during injection events.

In another aspect, the present invention resides in a method of fuel injection comprising constructing an hydraulic behaviour profile by fuel pressure measurement, using the hydraulic behaviour profile to predict fuel pressure that will prevail in a fuel injector during an injection event, and supplying a control signal to the fuel injector to control the amount of fuel injected during the injection event in accordance with the predicted fuel pressure.

By predicting the fuel pressure that will prevail in a fuel injector over the course of a forthcoming injection event in this way, the amount of fuel injected during the injection event can be more accurately controlled than would otherwise be possible, and accurate control can be achieved for all engine operating conditions and injection strategies.

Optionally, the hydraulic behaviour profile is constructed by repeatedly sampling fuel pressure. The method may include retrieving a stored hydraulic behaviour model, and applying the hydraulic behaviour profile to the stored model to predict the fuel pressures that will prevail in the fuel injector during the injection event.

One variant of the method includes constructing an hydraulic behaviour profile by measuring fuel pressure in an accumulator arranged to supply fuel to a plurality of fuel injectors in use, predicting, using the hydraulic behaviour profile, the fuel pressures that will prevail in the fuel injectors of the plurality during injection events, and controlling the fuel injectors of the plurality to control the amount of fuel injected during injection events in accordance with the predicted fuel pressures.

Accordingly, in another aspect, the invention resides in a fuel injection system for an internal combustion engine, the system comprising a plurality of fuel injectors, an accumulator arranged to supply fuel to the fuel injectors in use, a pressure sensor for measuring the pressure of fuel in the accumulator in use, and a control unit arranged to receive a pressure signal from the pressure sensor to construct an hydraulic behaviour profile, to predict, using the hydraulic behaviour profile, the fuel pressure that will prevail in an injector during an injection event, and to supply control signals to that fuel injector to control the amount of fuel injected during that injection event in accordance with the predicted fuel pressure.

The control unit may comprise a processor programmed repeatedly to sample the pressure signal from the pressure sensor to construct the hydraulic behaviour profile. Alternatively, or in addition, the control unit may comprise a memory for storing an hydraulic behaviour model and a processor programmed to apply the hydraulic behaviour profile to the stored model to predict the fuel pressure that will prevail in the injectors during injection events.

In another aspect, the invention resides in a method of predicting a fuel pressure characteristic in a fuel injector of a fuel injection system during an injection event, the method comprising measuring, before the injection event, a fuel pressure characteristic within the fuel injection system, and determining, using the measured fuel pressure characteristic, a predicted fuel pressure characteristic in the fuel injector during the injection event. Again, the fuel pressure characteristic may be measured by repeatedly interrogating a pressure sensor before the injection event, and the measured fuel pressure characteristic may comprise a sequence of fuel pressure values.

The fuel pressure characteristic may be measured within the fuel injector, for example when the fuel injectors of the fuel injection system are constructed according to the first aspect of the invention. Alternatively, the fuel pressure characteristic may be measured at a location in the fuel injection system upstream of the fuel injector, for example in an accumulator upstream of the fuel injector.

In one variant of the method, the measured fuel pressure characteristic is input to a model for hydraulic behaviour to determine the predicted fuel pressure characteristic in the fuel injector during the injection event. The predicted fuel pressure characteristic may comprise a predicted average fuel pressure in the fuel injector during the injection event.

By virtue of this aspect of the invention, the predicted fuel pressure characteristic can, for example, be used within the 'pressure-time' principle to determine an accurate value for the duration of an injection event required in order to deliver a desired quantity of fuel. To this end, the invention extends to a method of correcting a nominal fuel injection demand, comprising predicting a fuel pressure characteristic as described above, calculating a correction factor based on the predicted fuel pressure characteristic during the injection event, and applying the correction factor to the nominal fuel injection demand to compensate for variations in fuel pressure during the injection event. The nominal fuel injection demand may, for example, comprise the duration of a fuel injection event that would be required for delivery of a desired amount of fuel if the fuel pressure characteristic in the fuel injector were a constant pressure equal to the nominal pressure of fuel in an accumulator upstream of the injector.

Accordingly, the invention further extends to determining a nominal fuel injection demand according to engine operating parameters, and correcting the nominal fuel injection demand in accordance with the method described above.

When pressure sensors are provided in the fuel injectors, the local fuel pressures measured by the pressure sensors can be used to estimate the pressure of fuel in an accumulator, and thus provide an input to a feedback loop to control the fuel pressure in the accumulator. Thus, in another aspect, the invention resides in a method of estimating the pressure of fuel in an accumulator of a fuel injection system, the method comprising measuring local fuel pressures in a plurality of fuel injectors connected to the accumulator, and calculating an average value of the measured local fuel pressures to estimate the fuel pressure in the accumulator.

Any suitable strategy for calculating the average value of the measured local fuel pressures may be used. For example, the method may include weighting the measured local fuel pressures to account for the hydraulic characteristics of the fuel injection system.

A degree of robustness against sensor failure can be provided by virtue of another aspect of the present invention, in which a method of estimating the pressure of fuel in an accumulator of a fuel injection system is contemplated, the method comprising measuring local fuel pressures in a plurality of fuel injectors connected to the accumulator, detecting erroneous pressure signals from one injector of the plurality, and excluding the erroneous pressure signals from that injector from calculation of the pressure of fuel in the accumulator. Thus, if the pressure sensor of an injector fails, an estimate of the pressure of fuel in the accumulator can still be obtained.

In another aspect of the invention, there is provided a method of compensating for an error in the output of a fuel pressure sensor, the method comprising determining an average output of the fuel pressure sensor, comparing the average output of the fuel pressure sensor with a reference value, and, if the average output of the fuel pressure sensor differs from the reference value by more than a first pre-determined threshold value, applying a compensation offset to the output of the fuel pressure sensor.

In this way, sensor drift, offset inaccuracies, calibration errors and other such systematic variations in sensor output can be corrected or compensated for.

The method may include retrieving a stored compensation offset, for example a pre-determined value for incremental correction of the error in the output of the fuel sensor. In another variant, the method includes calculating a difference between the average output of the fuel pressure sensor and the reference value, and applying the difference to the output of the fuel pressure sensor as the compensation offset. In this case, the method may further comprise storing the compensation offset.

The method of compensating for an error in the output of a fuel pressure sensor may include an adaptive or incremental strategy for compensating for the error. In one such example, the method includes determining, after the compensation offset has been applied, an average output of the fuel sensor, comparing the average output of the fuel pressure sensor with the reference value, and, if the average output of the fuel pressure sensor differs from the reference value by more than a second pre-determined threshold value, applying a further compensation offset to the output of the fuel pressure sensor.

The method may include retrieving a stored reference value. For example, the reference value may be a pre-determined value stored in a memory. In a variant of the method, the reference value is calculated using an average output of one or more further fuel pressure sensors.

Again, a degree of robustness against sensor failure can be provided in accordance with another aspect of the invention, which resides in a method of predicting a fuel pressure characteristic in a fuel injector of a fuel injection system during an injection event, the method comprising measuring, before the injection event, fuel pressure characteristics within a plurality of fuel injectors, detecting an erroneous pressure signal from one injector of the plurality, and excluding the erroneous pressure signal from prediction of the fuel pressure characteristic.

So that a reasonable prediction of the fuel characteristic can be made, the method may comprise deriving a predicted fuel pressure characteristic from other injectors of the plurality, and applying that characteristic to the injector from which the erroneous pressure signal was detected.

In further aspects, the invention extends to a computer program product comprising at least one computer program software portion which, when executed in an execution environment, is operable to implement any of the methods according to the invention described above, and a data storage medium having the or each such computer program software portion stored thereon.

BRIEF DESCRIPTION OF THE DRAWINGS

FIG. 1 of the accompanying drawings, which is a schematic diagram of a known common-rail fuel injection system, has already been discussed. Preferred embodiments of the present invention will now be described, by way of example only, with reference to the remaining drawings in which like reference numerals are used for like features, and in which:

DESCRIPTION OF THE PREFERRED EMBODIMENTS

Figure 2:
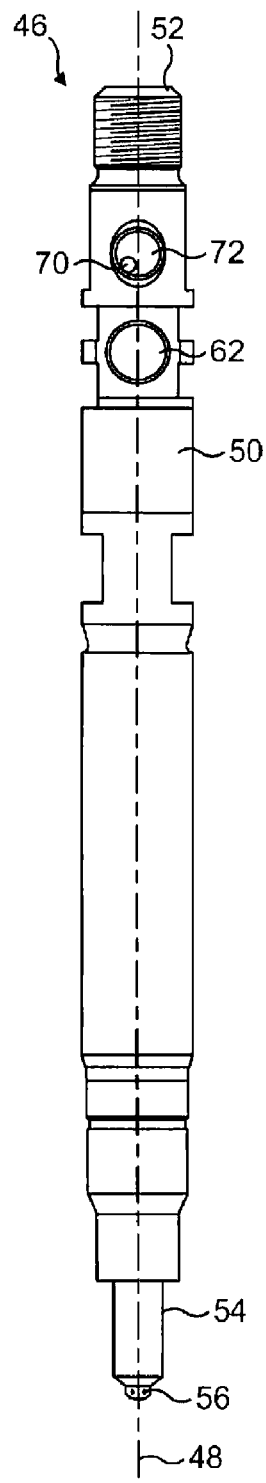
FIG. 2 is a side view of a first embodiment of a fuel injector according to the present invention.
Figure 3:
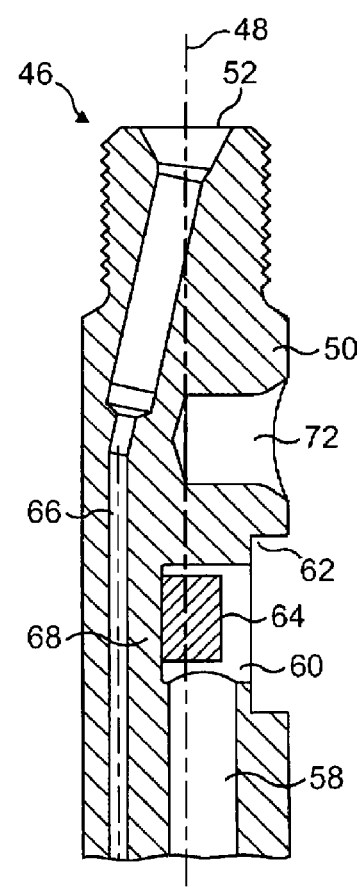
FIG. 3 is an enlarged longitudinal section of part of the fuel injector of FIG. 2.

FIGS. 2 and 3 show an exemplary fuel injector 46 according to a first embodiment of the present invention. FIG. 2 is a side view of the elongate injector 46 showing its longitudinal axis 48. FIG. 3 is an enlarged detailed view of the injector 46 in longitudinal section taken parallel to the longitudinal axis 48 of the injector 46.

The injector 46 comprises a generally cylindrical injector body 50 which, in use, extends through a cylinder head of an internal combustion engine. The upper part of the injector body 50 is provided with a fuel inlet 52, which receives high-pressure fuel from a common fuel rail (not shown). The lower part of the injector body 50 comprises a nozzle 54 arranged to inject fuel into a combustion chamber of the engine.

As is well known in the art of fuel injectors, the nozzle 54 houses a valve needle moveable between two positions. In a first, closed position, the needle seals against a seating surface of the nozzle 54 to prevent the flow of fuel through one or more orifices 56 provided in the nozzle 54. In a second, open position, the valve needle is retracted from the seating surface so as to allow fuel to flow through the or each orifice 54. The valve needle may be of the inwardly or outwardly opening type. The valve needle and the seating surface have been omitted from the drawings but may be arranged as shown in the Assignee's U.S. Pat. Nos. 6,234,404 and 7,159,799, the contents of which are incorporated herein by reference.

The central part of the injector body 50 houses an actuator for control of the valve needle. The actuator may, for example, be a piezoelectric actuator or a solenoid actuator. Part or all of the actuator undergoes longitudinal strain or is displaced longitudinally when the actuator is energised by the application of an electrical signal to electrodes of the actuator. Again, such actuators are well known in the art including the Assignee's U.S. patents identified above, and so have been omitted from the drawings.

A coupling is provided between the actuator and the valve needle, so that strain or displacement of the actuator, achieved by energising or de-energising the actuator, causes opening or closing movement of the needle. The coupling may, for example, comprise a mechanical connection between the actuator and the valve needle. The coupling may instead comprise a hydraulic coupling, in which case the operation of the actuator causes a pressure change in a chamber associated with the valve needle to provide an opening or closing force to the needle.

The actuator is accommodated within a chamber 58 in the injector body 50. The electrical connections to the actuator, which are typically in the form of blade terminals, are located within a further chamber or terminal cavity 60. A port 62 extends from the outside surface of the injector 46 into the injector body 50 to connect with the terminal cavity 60 and afford access to the electrical connections.

In this first embodiment of the invention, the injector 46 is provided with a pressure sensor 64 which is accommodated within the terminal cavity 60. Electrical connections to the pressure sensor 64 are made by way of the port 62, so that the electrical connections for the actuator and the pressure sensor 64 can be provided in a single connector (not shown) that fits into the terminal cavity 60. The electrical connections allow signals to be transmitted from the pressure sensor 64 to an ECU. The pressure sensor 64 may include electronic circuitry for conditioning the output signals of the pressure sensor 64.

A conduit or supply passage 66 is provided in the injector body 50 to allow the passage of high-pressure fuel from the fuel inlet 52 to the nozzle 54. The supply passage 66 has a wall 68 integral with the injector body 50, which separates the supply passage 66 from other passages and cavities within the injector body 50, for example the terminal cavity 60. Thus, the wall 68 retains high-pressure fuel within the supply passage 66 in use of the injector 46.

A return or back-leak passage 70 is also provided within the injector body 50 to return excess fuel to the fuel tank or other reservoir. A back-leak or return port 72 is provided in the upper part of the injector body 50 to allow connection of a fuel return pipe to the injector 46.

In use, the supply passage 66 is filled with fuel from the rail at high pressure via the fuel inlet 52. The pressure within the supply passage 66 gives rise to a strain within the injector body 50. Changes in fuel pressure within the supply passage 66 cause corresponding changes in the strain in the injector body 50. The pressure sensor 64 is arranged to respond to changes in the strain within the injector body 50, and in particular in a portion of the wall 68 that separates the pressure sensor 64 from the supply passage 66. In this way, the pressure sensor 64 provides an output signal that corresponds to the pressure of fuel in the supply passage 66.

Because the pressure sensor 64 is separated from the supply passage 66 by the wall 68, the pressure sensor 64 is not wetted by the fuel. In this way, the pressure sensor 64 is not directly subjected to the high-pressure environment within the supply passage 66, and need not be leak-proof. Furthermore, the supply passage 66 is not breached by a port or conduit, which would be required if the pressure sensor were to be in direct contact with the fuel in the supply passage 66. The risk of leakage or failure associated by such a breach in the supply passage 66 is therefore avoided.

Figure 4:
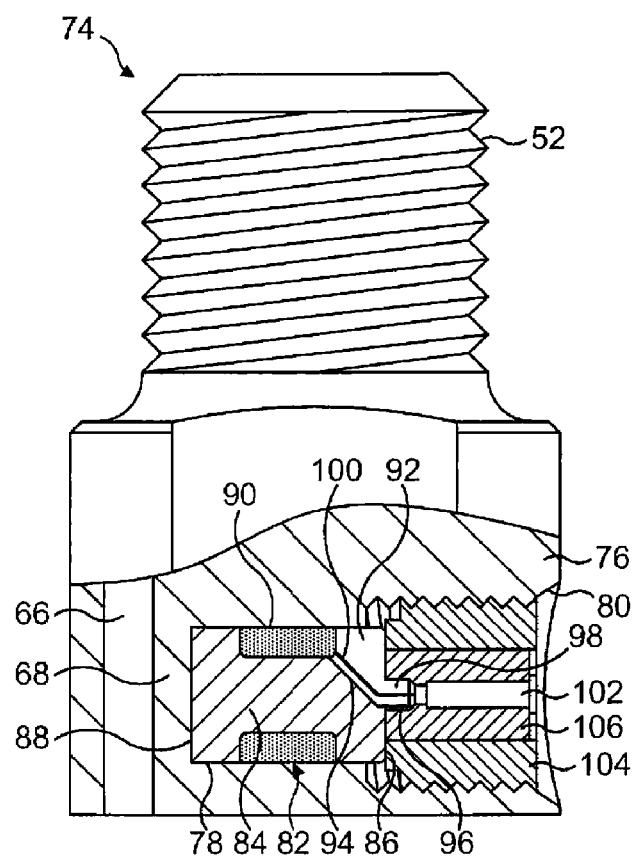
FIG. 4 is a partial longitudinal section of part of a second embodiment of a fuel injector according to the present invention.
Figure 5:
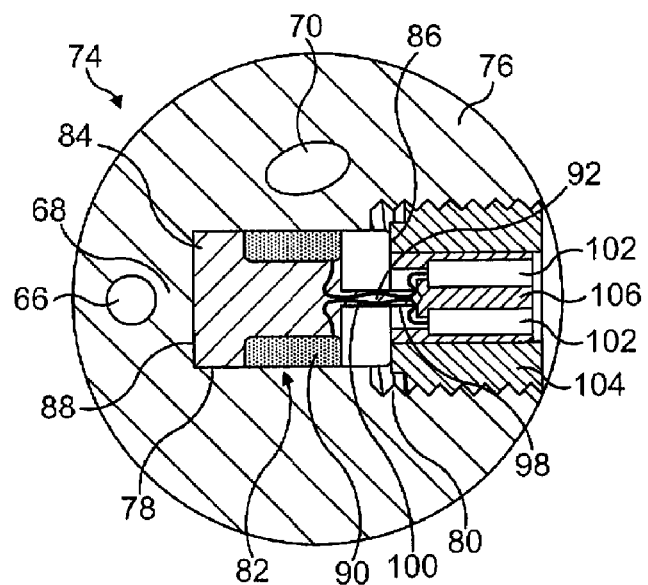
FIG. 5 is a cross-section through the fuel injector of FIG. 4.

FIG. 4 is a partial longitudinal section of part of a fuel injector 74 according to a second embodiment of the invention, and FIG. 5 is a cross-section through the injector 74 of FIG. 4 taken normal to the longitudinal direction. The construction of the fuel injector 74 of the second embodiment is similar to that of the first embodiment, and only the differences will be described in detail.

In this embodiment, the pressure sensor is not located within a terminal cavity of the injector body. Instead, the injector body 76 is provided with a sensor chamber 78 close to the fuel inlet 52, and a port 80 which leads from the sensor chamber 78 to the outside surface of the injector 74. A magnetostrictive pressure sensor 82 is located within the sensor chamber 78.

As shown most clearly in FIG. 5, the pressure sensor 82 is separated from the high-pressure fuel supply passage 66 by a wall 68 formed within the injector body 76. In this way, the pressure sensor 82 is influenced by strain in the injector body 76 in the region of the supply passage 66. Although the pressure sensor 82 is also located close to the back-leak passage 70, the fuel pressure within the back-leak passage 70 is low and does not result in any significant strain within the injector body 76.

The sensor 82 includes a slug or core 84 of magnetostrictive material. The general shape of the core 84 is a cylinder of revolution with an 'I'-shaped cross-section, as shown most clearly in FIG. 4. The core comprises a proximal end face 86, closest to the port 80, and a distal end face 88 closest to the supply passage 66 and abutting the wall 68. Thus, the distal end face 88 of the core 84 abuts the end of the sensor chamber 78 closest to the supply passage 66. The cylinder axis of the core 84 lies normal to the longitudinal axis of the injector 74. Furthermore, the cylinder axis of the core 84 lies normal to the longitudinal direction of the supply passage 66, so that the distal end face 88 of the core 84 lies parallel to the sensor passage 66.

A coil 90 is wound around the narrow part or neck of the I-section core 84. At its proximal end, the core 84 is provided with a groove 92 having an inclined first portion 94 and a second portion 96 which lies parallel to the cylinder axis of the core 84. One end of the inclined portion 94 of the groove 92 intersects the narrow part of the core 84, and the groove 92 extends to the proximal end face 86 of the core 84. The proximal end face 86 is provided with a central land or projection 98, and the second portion 96 of the groove 92 extends within the projection 98 to define a 'U'-shaped channel. Connecting wires 100 from the coil 90 are routed from the core 84 to the port 80 by way of the groove 92.

Electrical connections, in the form of terminal sockets 102, are disposed within the port 80, so that the sensor 82 can be connected to the ECU of an engine by way of a suitable connector (not shown). The terminal sockets 102 are connected to the connecting wires 100 and are supported within a clamp screw 104 by an insulating material 106, such as a ceramic material. The clamp screw 104 comprises an annular plug which carries external threads to mate with internal threads provided in the port 80.

The clamp screw 104 exerts an axial force on the core 84 of the sensor 82, so that the distal end face 88 of the core 84 is pressed firmly against the end of the sensor chamber 78. In this way, the strain in the injector body 76 adjacent to the sensor 82, and in particular the strain in the wall 68, resulting from and corresponding to the fuel pressure in the supply passage 66, causes deformation of the core 84 of the sensor 82.

The magnetic permeability of the core 84 changes in response to an applied stress. Thus, when the strain in the injector body 76 changes, corresponding deformation of the core 84 of the sensor 82 causes a change in its magnetic permeability. By measuring the inductance of the coil 90, via the electrical connections 102, the change in strain in the injector body 76, and in particular the strain in the wall 68, which arises from and relates to the fuel pressure in the supply passage 66 can be detected.

Figure 6:
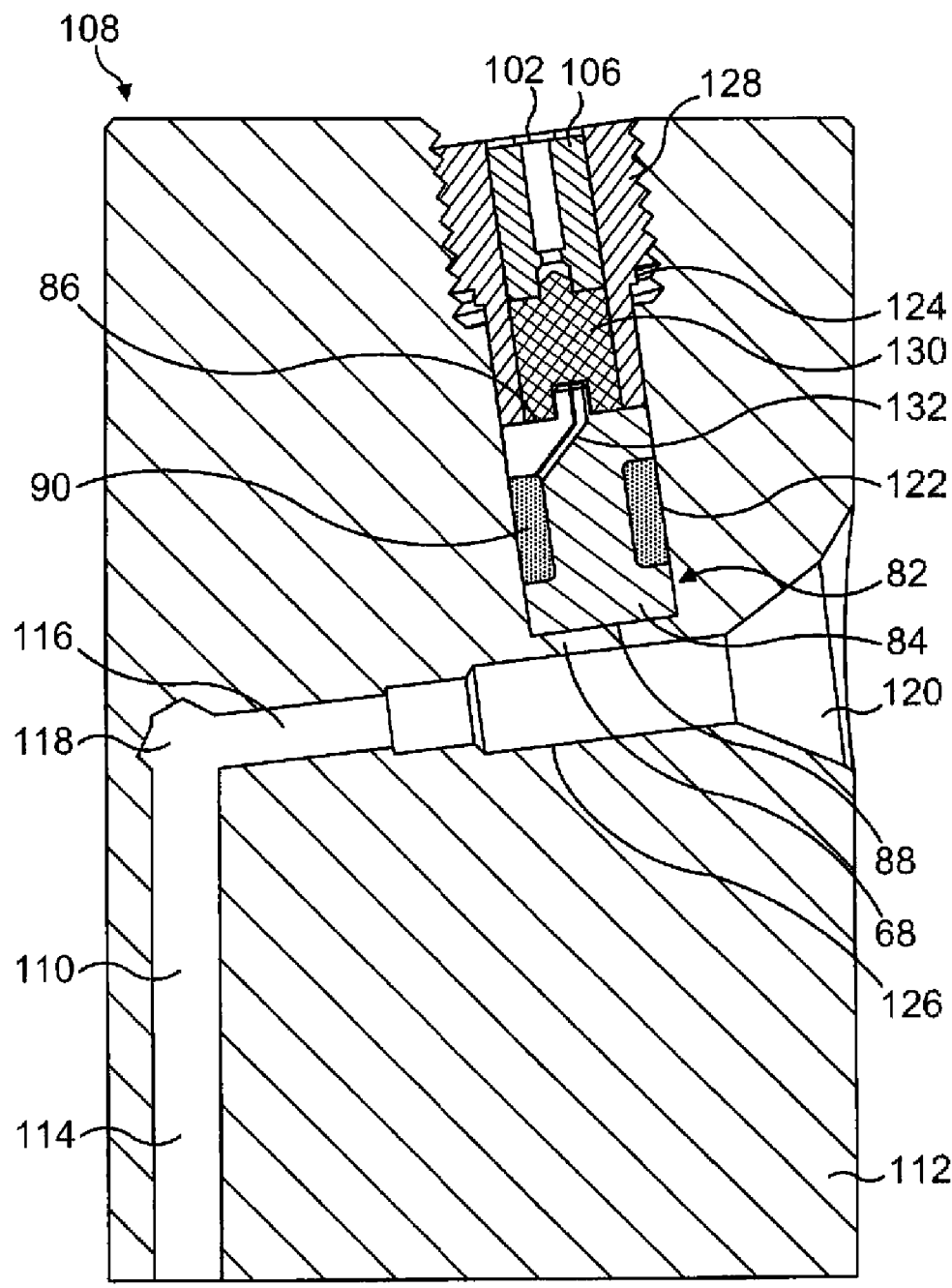
FIG. 6 is a longitudinal section of part of a third embodiment of a fuel injector according to the present invention.

FIG. 6 shows, in longitudinal section, part of a fuel injector 108 according to a third embodiment of the invention. The third embodiment of the invention is similar to the first and second embodiments, except in the arrangement of the fuel supply passage, the inlet port, and the pressure sensor.

FIG. 6 shows only the uppermost part of the fuel injector 108, opposed to the nozzle. The supply passage 110 extends within the injector body 112 and comprises a longitudinal portion 114 and an inclined portion 116. The two portions 114, 116 meet at an elbow 118. The longitudinal portion 114 of the supply passage 110 extends from the elbow 118 towards the nozzle (not shown). The inclined portion 116 of the passage 110 extends from the elbow 118, across the width of the injector 108, to the outer side surface of the injector 108 to form an inlet port 120. Unlike the first and second embodiments of the invention, in this third embodiment the inlet port 120 is provided on the side of the injector 108, rather than at the top.

A sensor chamber 122 is provided within the injector body 112, above the inclined portion 116 of the supply passage 110. A threaded port 124 connects the sensor chamber 122 to the uppermost, top surface of the injector 108. As in the second embodiment of the invention, a magnetostrictive pressure sensor 82 comprising a core 84 and a coil 90 is provided in the sensor chamber 122.

The distal end face 88 of the core 84 is located close to the inclined portion 116 of the fuel supply passage 110, in a region 126 where the inclined portion 116 has an enlarged diameter. The enlarged diameter region 126 may, for example, accommodate a filter or a flow-conditioning device (not shown). The pressure sensor 82 is inclined to the longitudinal direction of the injector 108, so that the distal end face 88 of the core 84 lies parallel to the side wall of the enlarged diameter region 126 closest to the sensor 82.

The pressure sensor 82 is held in position by a clamp screw 128 located in the port 124. Like the preceding embodiment, terminal sockets 102 are provided in a central portion of the clamp screw 128, within a plug 106 of insulating material. In this embodiment, the clamp screw 128 has a tubular forward extension that bears against the proximal end face 86 of the core 84 to provide a clamping force on the core 84. A cylindrical spacer 130 is provided within the tubular forward extension between the proximal end face 86 of the core 84 and the insulating plug 106, and connecting wires 132 from the coil 90 pass through the spacer 130 to the terminal sockets 102. The spacer 130 may house an electronic module, so as to provide signal conditioning electronics for the pressure sensor 82.

As in the second embodiment of the invention, the pressure sensor 82 is responsive to changes in strain in the body 112 of the injector 108, and particularly changes in strain in the wall 68 of the supply passage 110, which result from changes in fuel pressure in the supply passage 110.

For a given fuel pressure, the strain in the body 112 of the injector 108 is larger close to the enlarged diameter region 126 of the supply passage 110 than close to regions of the supply passage 110 where the diameter of the passage 110 is not enlarged. Thus, by positioning the sensor 82 close to the enlarged diameter region 126, the response of the pressure sensor 82 is optimised.

Many modifications to and variations of the fuel injector of the invention are possible. Some such modifications will now be described, by way of example only.

The pressure sensor provided in the injector body may be of any suitable type. For example, a magnetostrictive sensor corresponding to any of the types described in the present applicant's U.S. Pat. Nos. 7,234,361 and 7,146,866, or in the present applicant's United States Patent Application Publication No. 2006/0016277, may be provided. The contents of those documents are hereby incorporated by reference. It is conceivable that the core of the sensor could be integrated with the injector body.

Instead of a magnetostrictive sensor as described above, a piezoelectric or piezoresistive pressure sensor could be used. The pressure sensor may produce an output signal which relates to the magnitude of the static strain in the injector body. This would be the case when the pressure sensor comprises a piezoresistive strain gauge. Instead, the output of the pressure sensor may relate to only dynamic changes in the strain, for example when the pressure sensor comprises a piezoelectric strain gauge.

Temperature compensation of the pressure sensor signal may be desirable and, in the case when a magnetostrictive sensor is employed, the temperature compensation may for example be achieved by methods of the type described in the present applicant's United States Patent Application Publication No. 2007/0096724, the contents of which are hereby incorporated by reference.

When a pressure sensor is provided within a terminal cavity of an injector, the electrical connection to the sensor may be separate from or integrated with the electrical connection to the actuator. In one variant, the pressure sensor is integrated with an actuator electrical connector. In these ways, the electrical connections to the sensor are particularly straightforward.

The injector body may comprise several individual components. For example, separate sections of the injector body may house the needle, the actuator, the coupling between the actuator and the needle, the electrical connections, and so on. The sections may be clamped together by an outer sheath or housing. When the injector body comprises two or more individual components or sections, it is conceivable that the pressure sensor may be responsive to the relative displacement of two components, where the displacement is caused by and relates to the pressure of fuel within the supply passage extending through one or more of the components.

It will be appreciated that the location of the sensor within the injector body may be different from the locations described above. Indeed, the position of the sensor could be anywhere within the injector body, provided that the sensor is capable of sensing the strain, deformation or deflection in the injector body that results from the fuel pressure in the supply passage. In this way, the present invention can be employed in fuel injectors with various arrangements of components or which operate differently from those described above.

By providing fuel pressure sensors in each individual injector of an engine, the present invention allows and extends to continuous monitoring and tracking of the fuel pressure that exists within the fuel injector during operation of the injector. In this way, the pressure of the fuel when an injection event takes place can be accurately determined, so that control of the quantity of fuel injected can be improved in comparison to previous injector control systems.

Various methods for operating and controlling fuel injectors according to the invention in an internal combustion engine will now be described.

Figure 7:
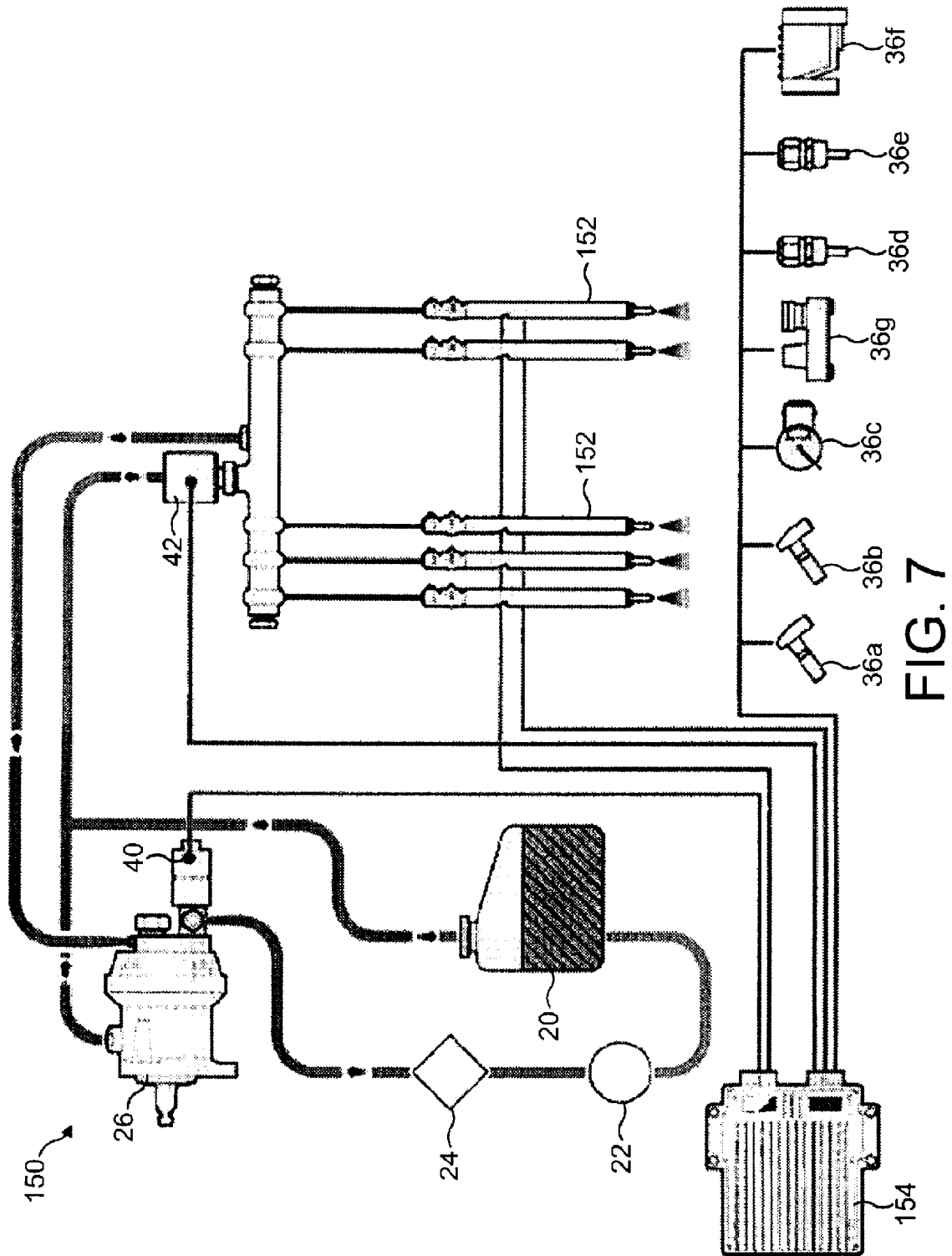
FIG. 7 is a schematic diagram of a common rail fuel injection system according to the present invention that may incorporate any of the fuel injectors shown in FIGS. 2 to 6.

FIG. 7 shows a fuel injection system 150 according to the invention. The fuel injection system 150 is similar to the conventional system shown in FIG. 1, except in that each of the fuel injectors 152 are provided with an integrated fuel pressure sensor as previously described, and the ECU 154 receives signals from the pressure sensors in each of the fuel injectors 152.

Figure 1:
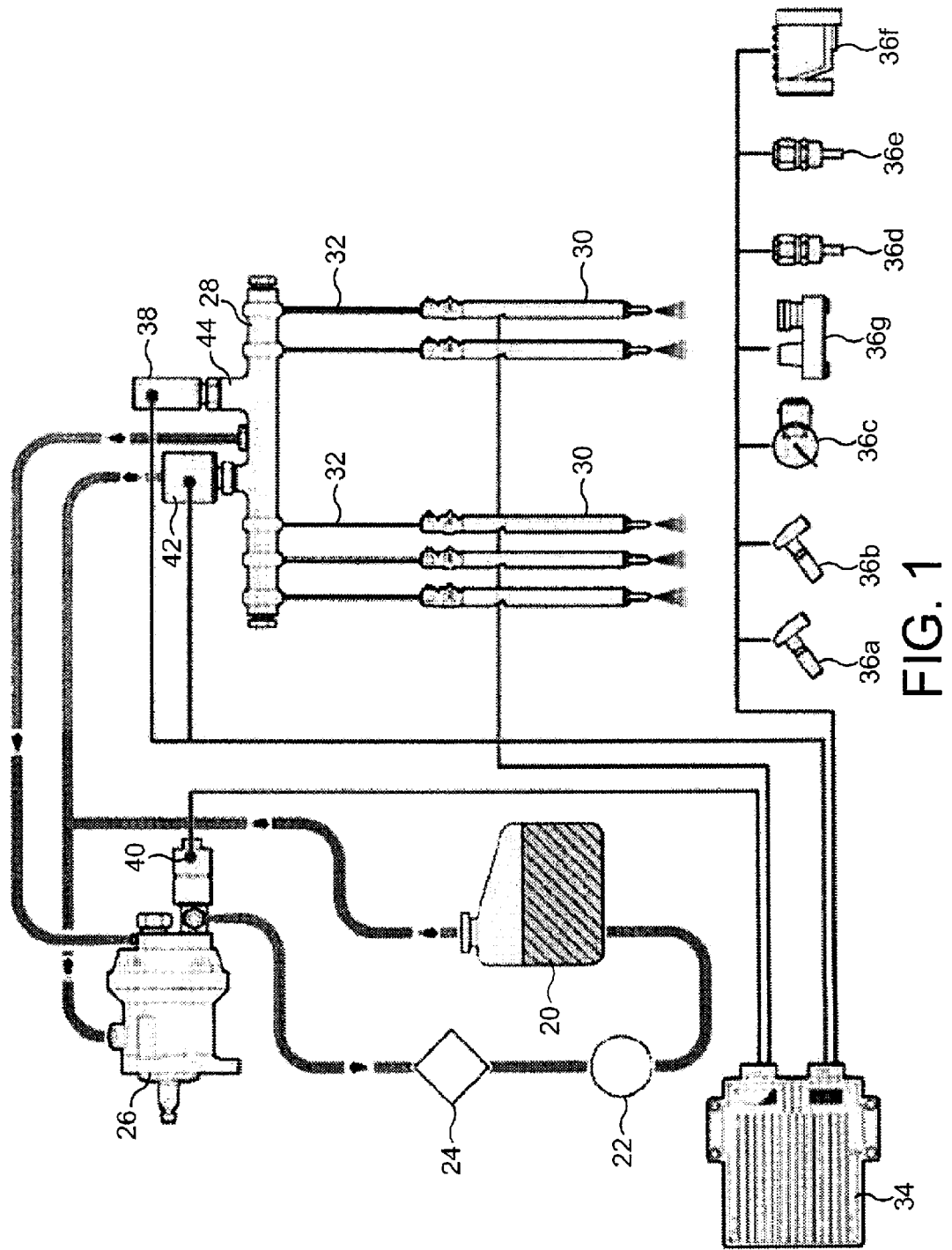

Those components of the fuel injection system 150 previously described with reference to FIG. 1 are indicated in FIG. 7 with reference numerals corresponding to those of like components in FIG. 1.

To obtain a value for the pressure of fuel in the supply passage of an injector 152, the output signal from that injector's pressure sensor is evaluated by the ECU 154. The ECU 154 includes a stored calibration curve, which relates the value of the signal from the pressure sensor to corresponding values for the fuel pressure in the supply passage.

The calibration curve may, for example, be obtained by testing an injector fitted with intrusive pressure sensors which monitor the pressure in the fuel supply passage directly.

Figure 8:
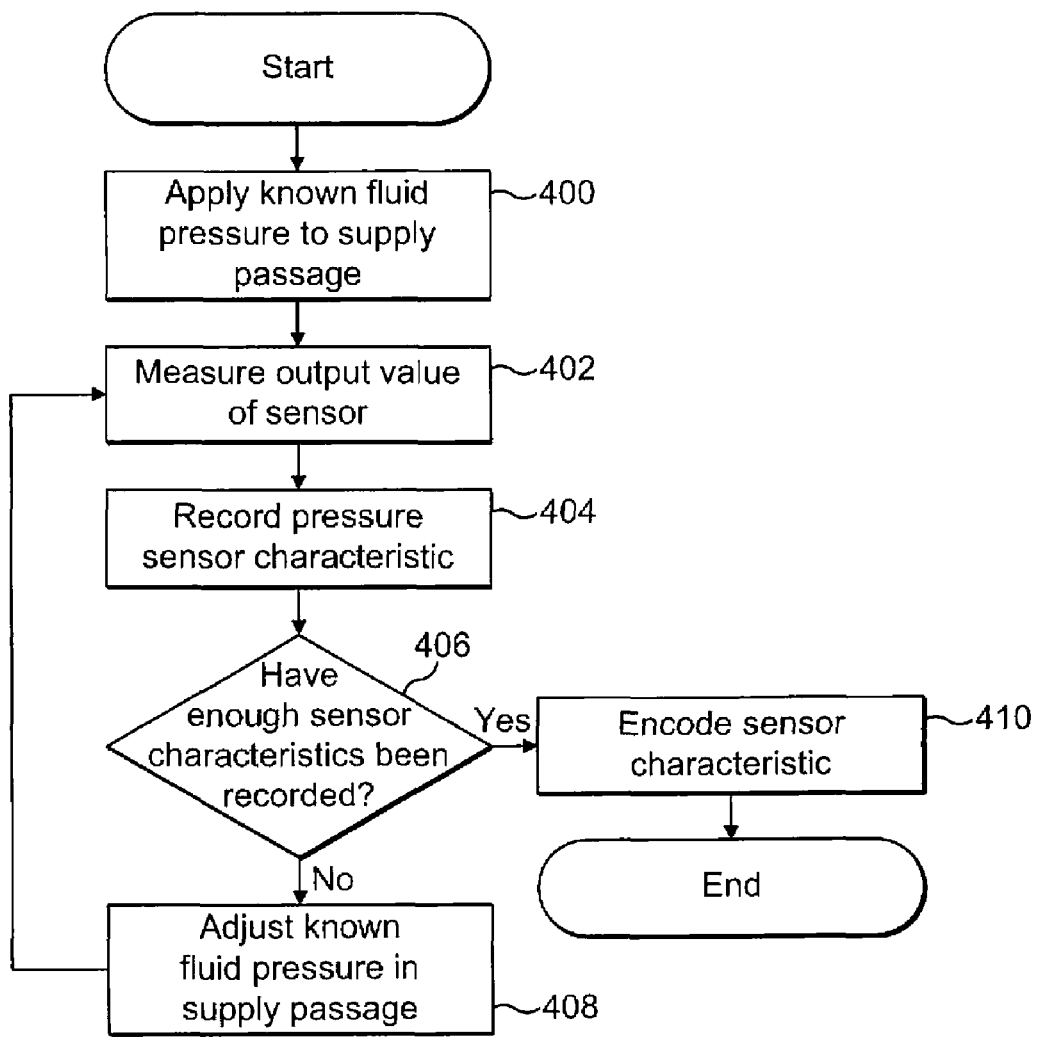
FIG. 8 is a flowchart of a method of calibrating a fuel injector according to the present invention.
Figure 9:
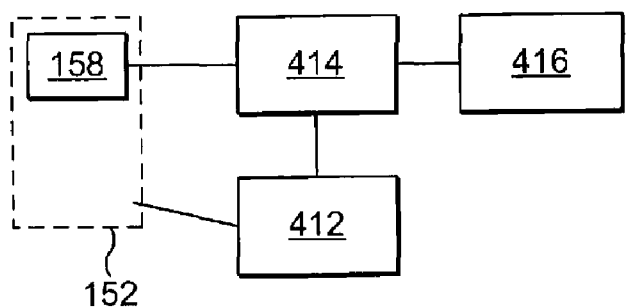
FIG. 9 is a simplified schematic diagram of apparatus arranged to perform the method of FIG. 8.

An alternative method for obtaining a calibration curve is shown in FIG. 8, and FIG. 9 shows apparatus suitable for performing the method of FIG. 8. In this case, the sensor characteristic or calibration curve is instead obtained by testing individual injectors 152 after their manufacture, for example by applying (at 400 in FIG. 8) a known fluid pressure to the supply passage by way of a fluid supply 412, measuring (402 in FIG. 8) an output value of the pressure sensor 158 of the injector 152 and recording (404 in FIG. 8) the output value and the fluid pressure as a sensor characteristic, using a data recorder 414. The fluid pressure in the supply passage is then adjusted (408 in FIG. 8) to another known value for measurement and recording of further output values of the pressure sensor 158. Once a predetermined number of calibration values have been recorded (406 in FIG. 8), the sensor characteristic is encoded (410 in FIG. 8) using an encoder 416.

Figure 10:
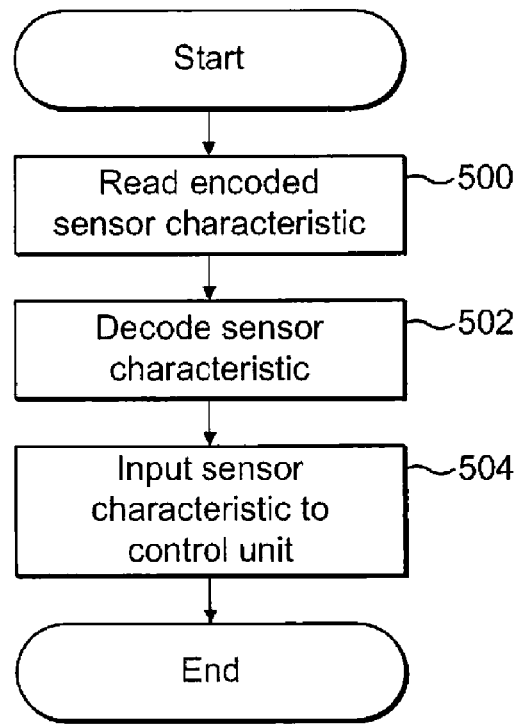
FIG. 10 is a flowchart of a method of programming an ECU with pressure sensor calibration information.
Figure 11:
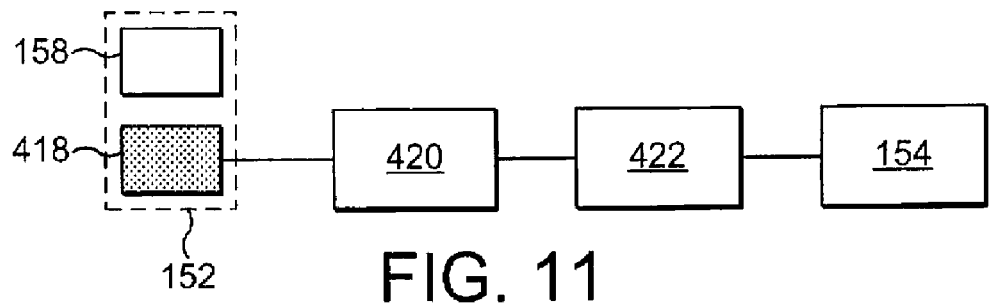
FIG. 11 is a simplified schematic diagram of apparatus arranged to perform the method of FIG. 10.

FIG. 10 shows a method for programming an ECU of the fuel injection system with the calibration information, and FIG. 11 is a schematic diagram of apparatus suitable for performing the method of FIG. 10. The calibration curve and other sensor characteristics may optionally be encoded in a machine-readable format and supplied with the fuel injector 152, for example as a two-dimensional barcode 418 printed on the injector 152 as shown in FIG. 11, or on the packaging of the injector. The encoded data 418 may then be read by a reader 420 (at 500 in FIG. 10) and decoded in a decoder 422 (502 in FIG. 10) to determine the sensor characteristics, including the calibration curve. The sensor characteristics are then input to the ECU 154 (504 in FIG. 10) during assembly of the engine or upon replacement of an injector. Furthermore, other characteristics of the fuel injector, for example the actuator behaviour, may also be encoded in the barcode for input to the ECU 154.

Referring again to FIG. 7, the quantity of fuel delivered to a combustion chamber during an injection event is related to the pressure of fuel at the tip of the nozzle of the respective injector 152, adjacent to the orifices. Ideally, therefore, the pressure sensor is located close to the tip of the nozzle. However, in the present invention it is often more convenient to locate the pressure sensor close to the supply passage at a position remote from the nozzle tip. In that case, the ECU 154 applies a correction factor to the pressure sensor signal to evaluate the fuel pressure in the supply passage. The correction factor may, for example, account for the dynamic pressure losses in the supply passage between the vicinity of the pressure sensor and the nozzle tip.

During normal operation of the engine, the pressure sensors associated with each injector 152 provide their respective signals to the ECU 154. Each signal corresponds to the instantaneous local pressure in one of the injectors 152. When the signals are considered together, the time average of these local pressures will vary slightly from one another, for example as a result of sensor drift, calibration errors, or offset inaccuracies.

Figure 12:
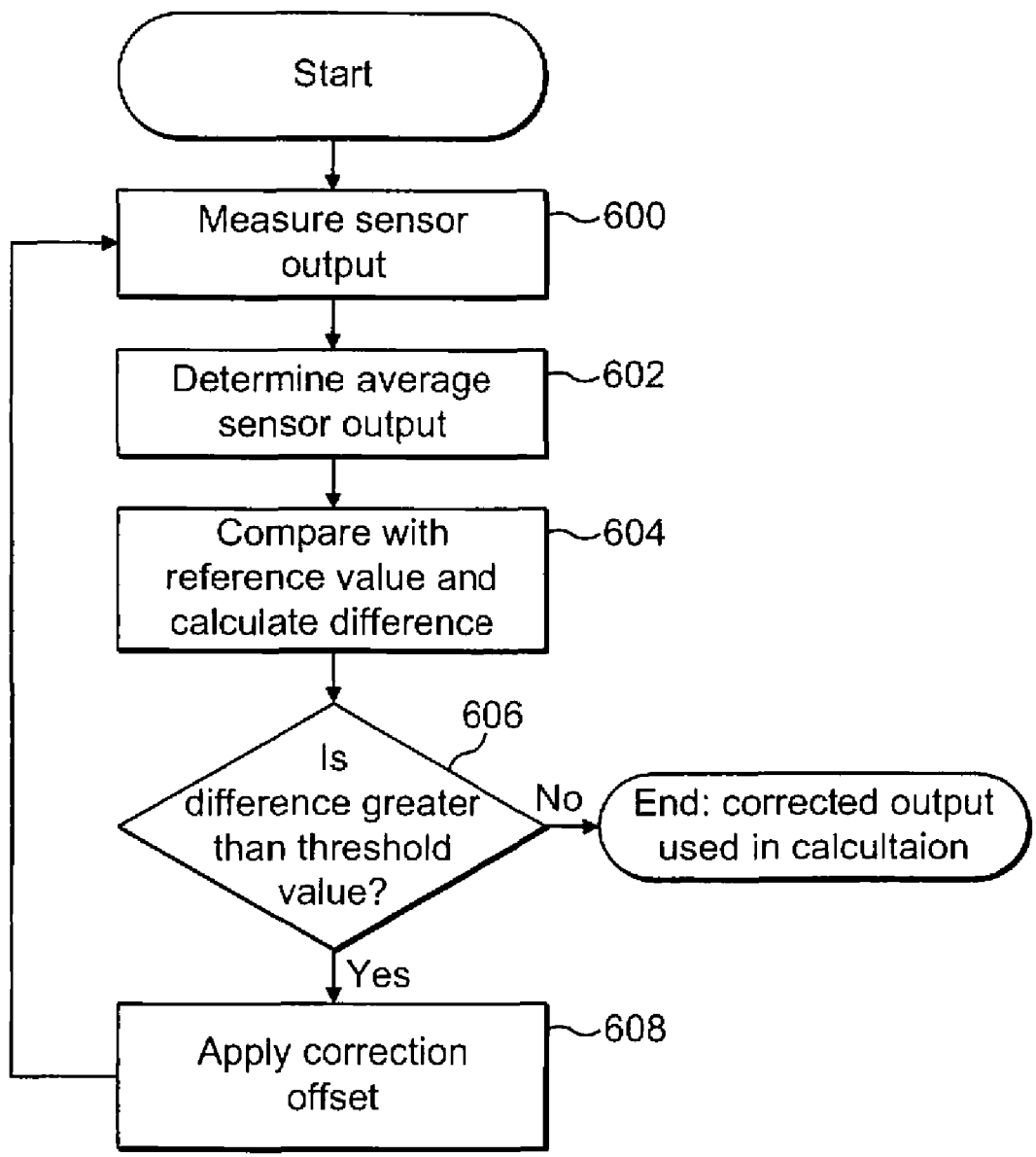
FIG. 12 is a flowchart of a method for compensating for an error in the output of a fuel pressure sensor.
Figure 13:
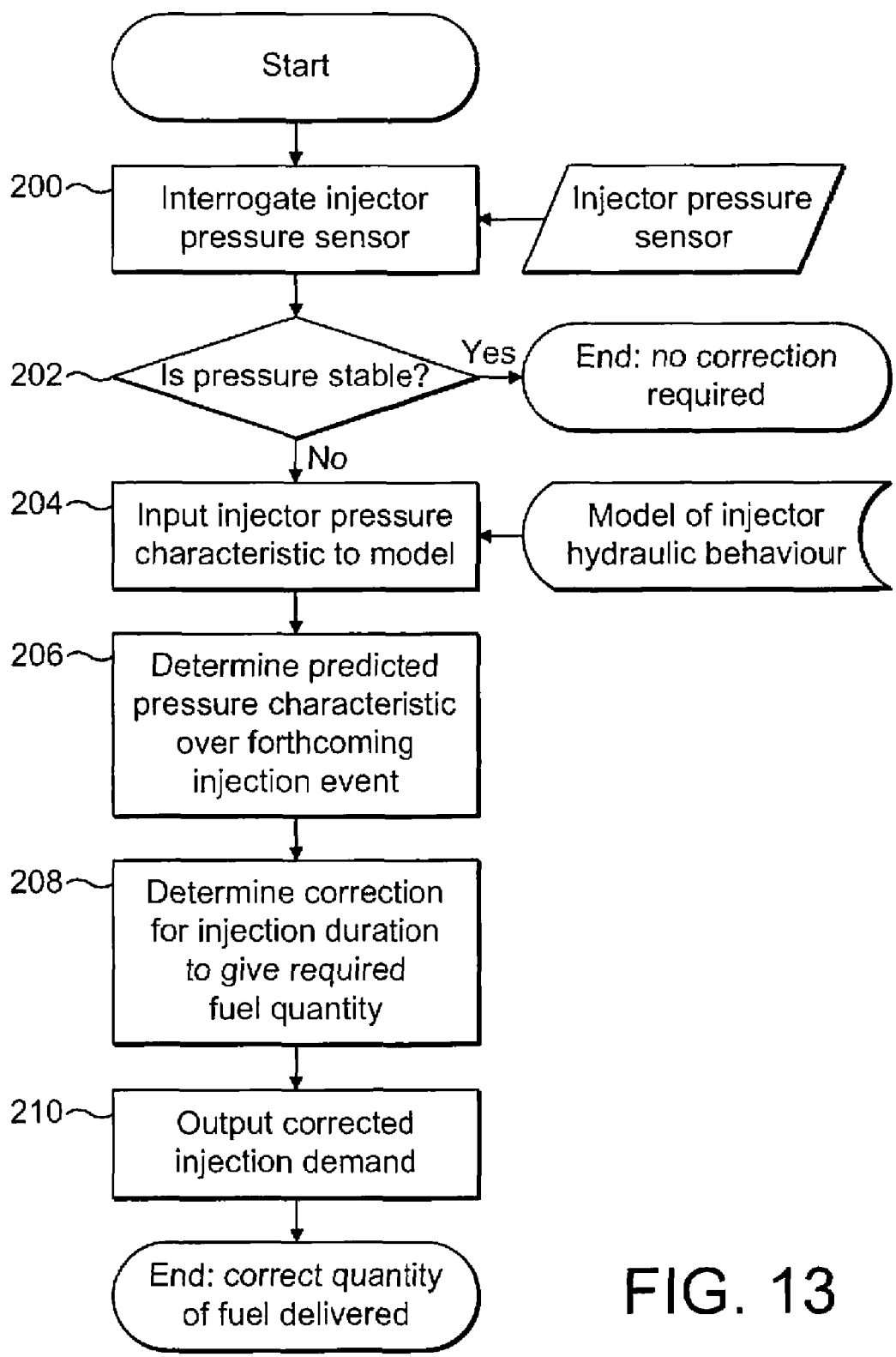
FIG. 13 is a flowchart of a first expression of a method of fuel injection according to the present invention.

The ECU 154 can correct for such errors by an adaptive learning method, for example as shown in FIG. 12. At 600 in FIG. 12, the output from a sensor is measured, and at 602 the average sensor output is determined as an average local pressure. At 604, the ECU 154 compares the average local pressure recorded in the injector 152 with a reference value, for example the average local pressure recorded by the sensors in each of the other injectors 152. At 606 in FIG. 12, if the difference between two local pressure values exceeds a predefined threshold value then, at 608 in FIG. 12, the ECU 154 responds by applying a correction offset to the sensor signal from the injector 152 from which the erroneous reading originates. The average local pressures are again compared. If the difference still exceeds the threshold value, a further correction offset is applied, and this process repeats iteratively until the difference falls below the threshold value. At that stage, the correction offset is stored in the ECU 154 and is applied thereafter to the signal from the corresponding injector 152 for use in subsequent calculations.

The instantaneous injection pressures will also differ from injector to injector, as a result of hydraulic disturbances due to the injection events. For example, when a first injector performs an injection, the local pressure will drop rapidly in that injector. The pressure in a second injector will decay at a slower rate, because the pressure drop takes some time to be transmitted from the first injector, through the fuel rail, and to the second injector.

In the embodiment shown in FIG. 7, no pressure sensor is provided in the fuel rail 156 of the system 150. Therefore, no port need be provided in the fuel rail 156 for such a sensor. The mean pressure in the fuel rail 156 can be estimated in the ECU 154 by calculating an appropriate average of the local pressure values from the individual injectors 152. In this way, the high-pressure fuel pump inlet metering valve 40 and the fuel rail pressure control valve 42 can be controlled by the ECU 154, using the estimated fuel rail pressure.

Should one of the pressure sensors associated with the injectors 152 fail, the ECU 154 can detect the failure by checking for erroneous signals, and can exclude that sensor from further calculations to calculate the estimated rail fuel pressure. In this way, the fuel injection system 150 can continue to function even if one or more pressure sensors fail.

When the injection strategy of the engine demands a single injection event per fuel injector 152 over one combustion cycle, it can be assumed that the pressure perturbations generated by the previous injection event for that cylinder, and for any other cylinder, will have decayed before the next injection event begins. In this way, the local pressure in each injector prior to an injection event will be stable, and the time for the forthcoming injection event can be accurately calculated by the ECU 154 on the basis of the measured local pressure.

Figure 14:
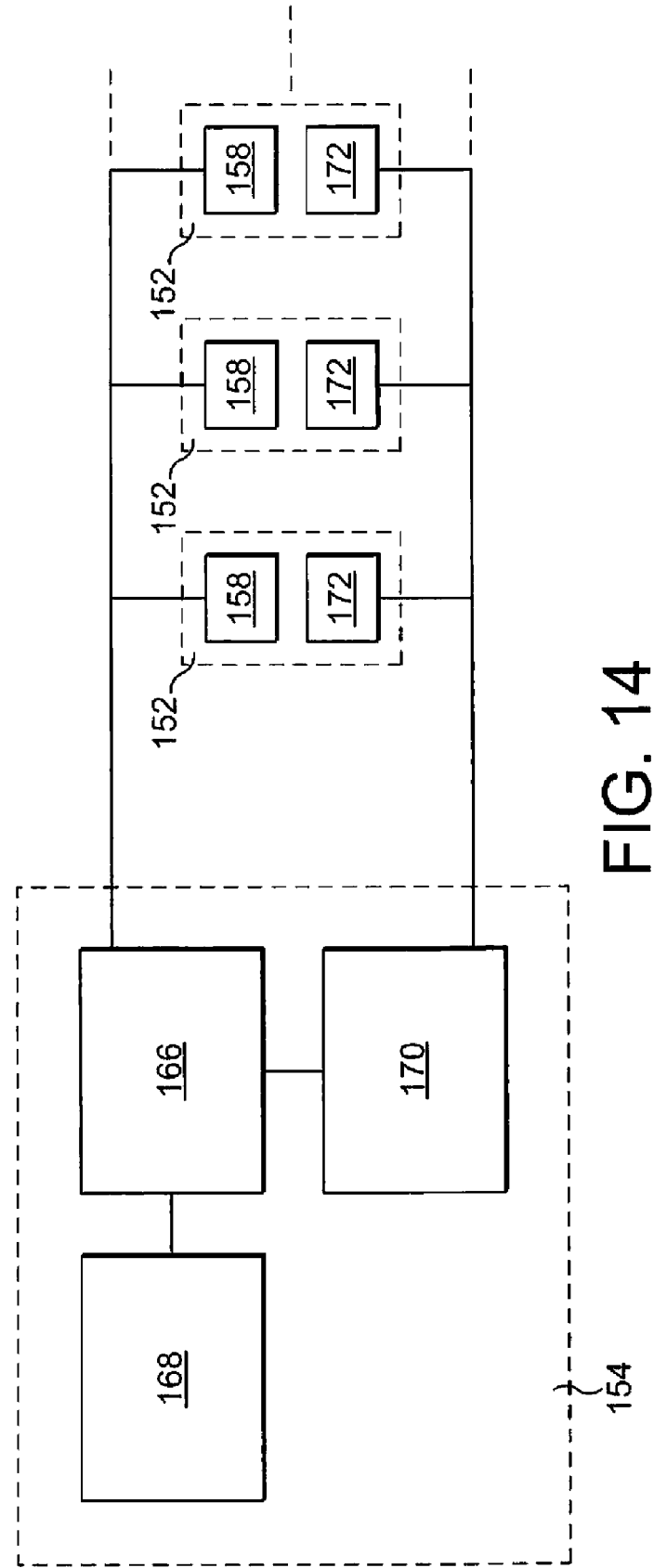
FIG. 14 is a simplified schematic diagram of elements of the fuel injection system of FIG. 7, particularly an ECU and fuel injectors, arranged to perform the method of FIG. 13.

When the injection strategy of the engine demands more than one injection event per fuel injector per combustion cycle, pressure perturbations from a first injection event in the injection sequence may still be present when a second injection event in the sequence takes place. The present invention provides a method for correcting or compensating for these pressure perturbations, so that the correct quantity of fuel is delivered into the combustion chamber by each injection event. A first expression of such a method will now be described with reference to FIG. 12. Apparatus suitable for performing the method is shown schematically in FIG. 14. The apparatus comprises an ECU 154 and fuel injectors 152 each with integrated pressure sensors 158, for example as shown in FIG. 7.

The hydraulic behaviour of the fuel injector 152—particularly the way in which pressure waves tend to propagate in a fuel injector 152—can be calculated or measured relatively accurately. Furthermore, the dynamics of the pressure waves that arise as a result of injection events are predictable over time when the hydraulic characteristics of the injector 152 are known. Therefore, by predicting a local fuel pressure characteristic within an injector 152, such as the evolution with time of a pressure wave within an injector 152, an expected local pressure at the time of a subsequent injection event can be determined from pre-injection measurements of the local pressure.

Figure 15:
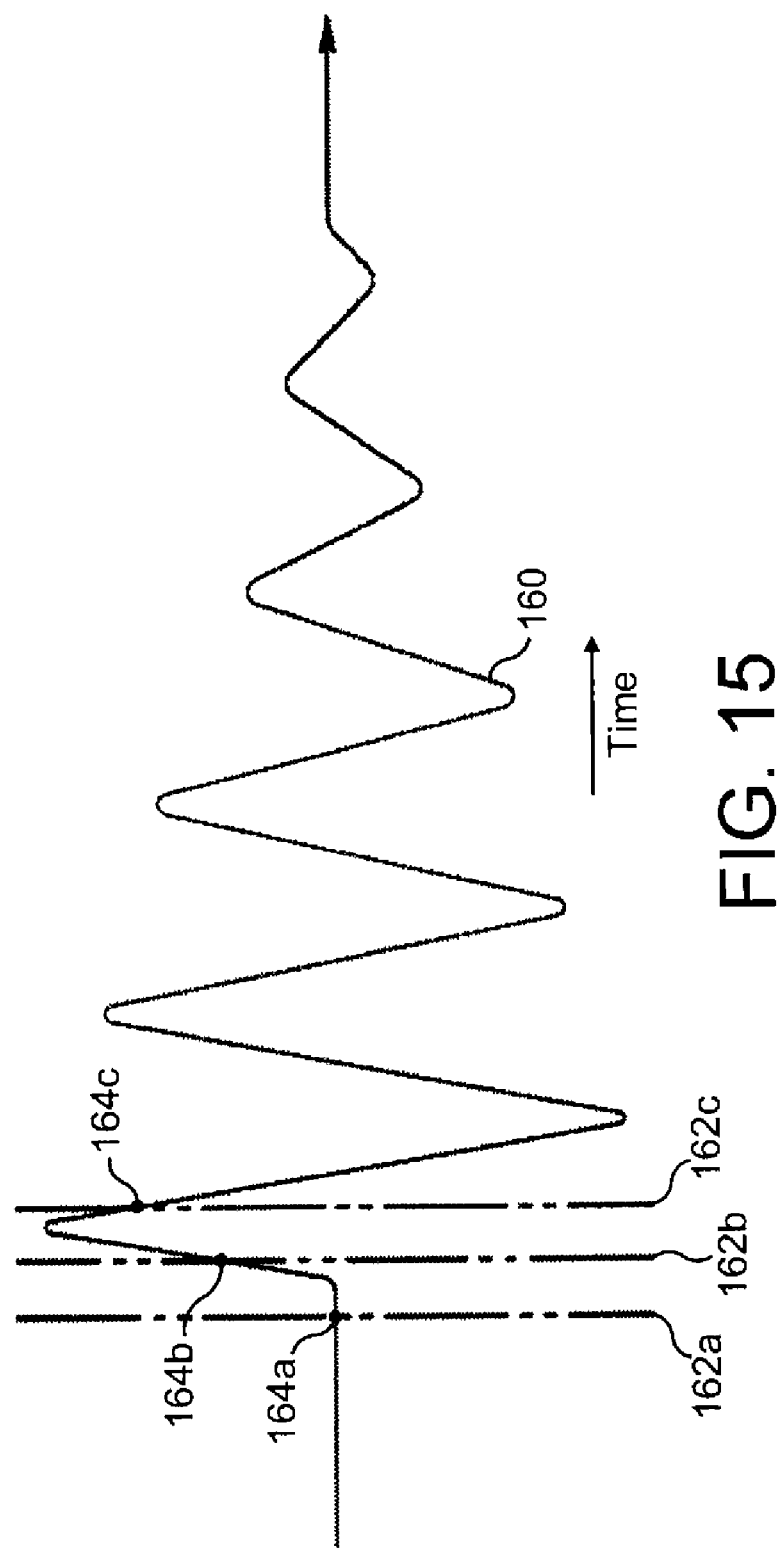
FIG. 15 is a schematic diagram showing the evolution of fuel pressure over time expressed as a fuel pressure sensor output (vertical axis) against time (horizontal axis) within a fuel injector.

FIG. 15 shows schematically the evolution of the local fuel pressure 160 within a fuel injector 152 following an injection event. Thus FIG. 15 could also represent the output signal of a fuel pressure sensor 158 integrated in a fuel injector 152.

At 200 in FIG. 12, prior to an injection event the fuel pressure sensor 158 of the corresponding injector 152 is interrogated repeatedly at predetermined or otherwise known intervals. The optimum number and frequency of the interrogations depends upon the hydraulic characteristics of the injector, but in a typical example at least ten interrogations are be performed at a frequency of 50 KHz or more. The interrogations, indicated at 162a, 162b and 162c in FIG. 15, generate a sequence of local fuel pressure values 164a, 164b and 164c respectively. Three interrogations 162a-162c are shown but there could be any desired number of interrogations. At 202 in FIG. 12, a processor 166 of the ECU 154 compares the results 164a-164c of each interrogation 162a-162c to determine whether the pressure is stable. If the ECU 154 detects no significant difference between the results 164a-164c of the interrogations 162a-162c, then no pressure wave is present. It can be assumed that the impending injection event will not be affected by pressure perturbations and no correction to the injection time is applied.

If, however, the ECU 154 detects a difference between the results 164a-164c of the interrogations 162a-162c, as shown in FIG. 15, then it is established that a pressure wave is present. A model of the hydraulic behaviour of the injector 152 is retrieved from storage in a memory 168 of the ECU 154, and, at 204 in FIG. 12, the results 164a-164c of the interrogations 162a-162c are input to the model to predict how the pressure wave will evolve over the duration of the forthcoming injection event.

The model may, for example, comprise a number of stored sets of pressure wave characteristic data acting as common profiles, fingerprints or signatures that show how the local pressure varies with time following injection events, taking account of other parameters such as fuel pressures and injection times. These data sets could be obtained by calculation or during calibration procedures using test systems. In operation, the ECU 154 matches the results 164a-164c of the interrogations 162a-162c to the stored data. Once a match is found, the data corresponding to the pressure wave can be retrieved from the memory 168 and analysed by the processor 166 to predict, at 206 in FIG. 12, how the pressure wave will propagate over the forthcoming injection event.

If necessary, the ECU 154 determines and applies a correction to the injection duration, at 208 in FIG. 12, so as to ensure that the desired quantity of fuel is injected. For example, the hydraulic model may provide as an output a predicted mean value for the local pressure in the injector 152 over the expected duration of the forthcoming injection event. This predicted mean value is then used to calculate the injection duration required to inject the required quantity of fuel. This injection duration may be greater than or less than the nominal injection duration which would be necessary to deliver the required fuel had the local pressure been determined as stable.

At 210 in FIG. 12, the required injection time is output to an injector control unit 170 of the ECU 154, which generates an injector control signal. The injector control signal is output to the actuator 172 of the fuel injector 152 to actuate the opening and closing movement of the needle.

Figure 16:
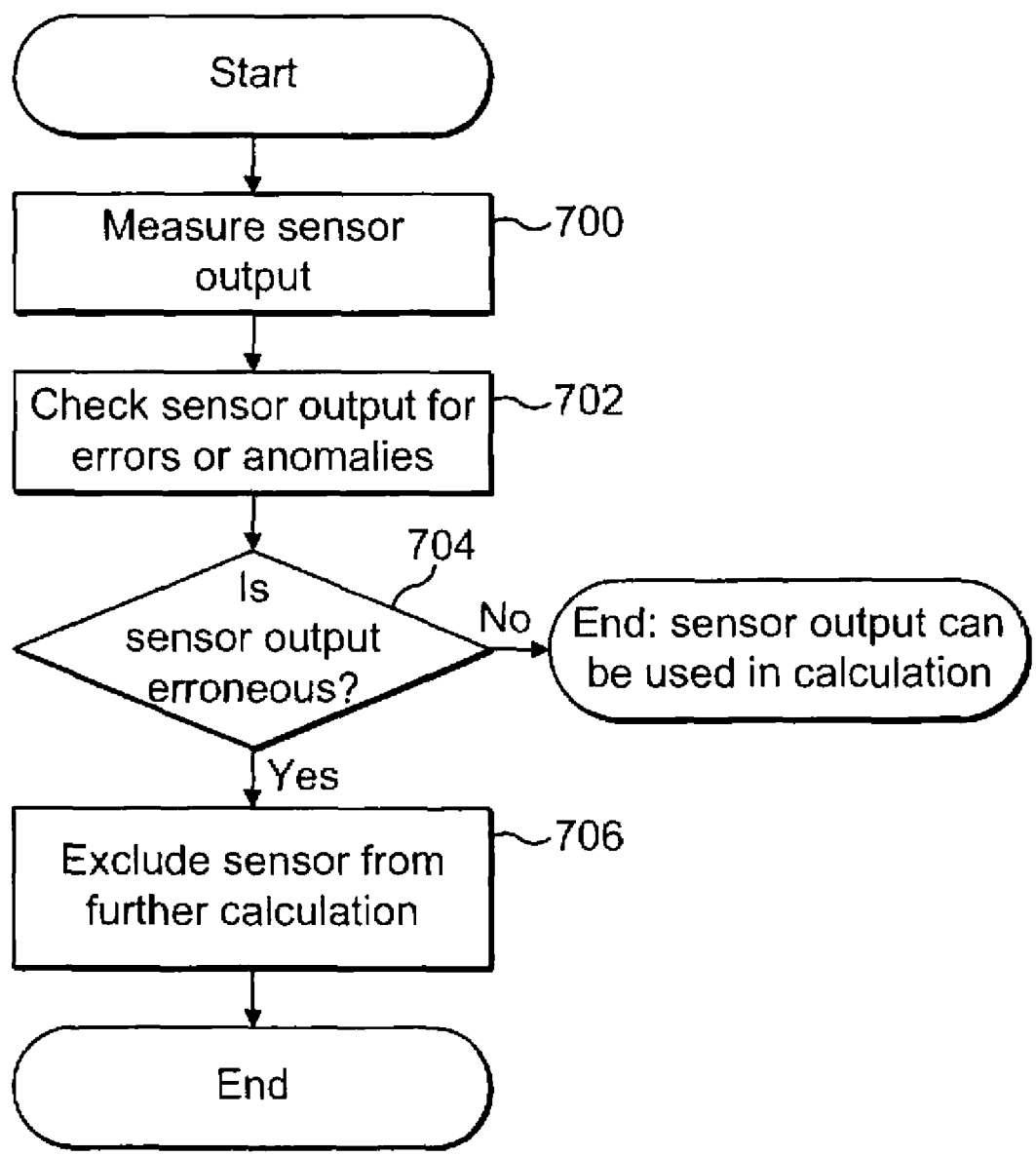
FIG. 16 is a flowchart of a method of predicting a fuel pressure characteristic in a fuel injector in the case when an erroneous signal is detected.

FIG. 16 shows a method for mitigating the effects of pressure sensor failure. At 700 in FIG. 16, the ECU measures the output from a sensor 158 and, at 702, the ECU checks the sensor output for errors or anomalies indicative of failure of the sensor 158, for example a zero output. If the sensor output is determined as erroneous (at 704), the ECU excludes the signal from that pressure sensor 158 from further calculations and can instead use an alternative input for the hydraulic behaviour model or other calculation. For example, should the pressure sensor 158 of one of the injectors 152 fail, the ECU 154 can apply the injection times calculated for another one of the injectors 152 undergoing the same or a similar injection sequence to the injector with the failed sensor. In this way, a degree of robustness against sensor failure is provided.

Figure 17:
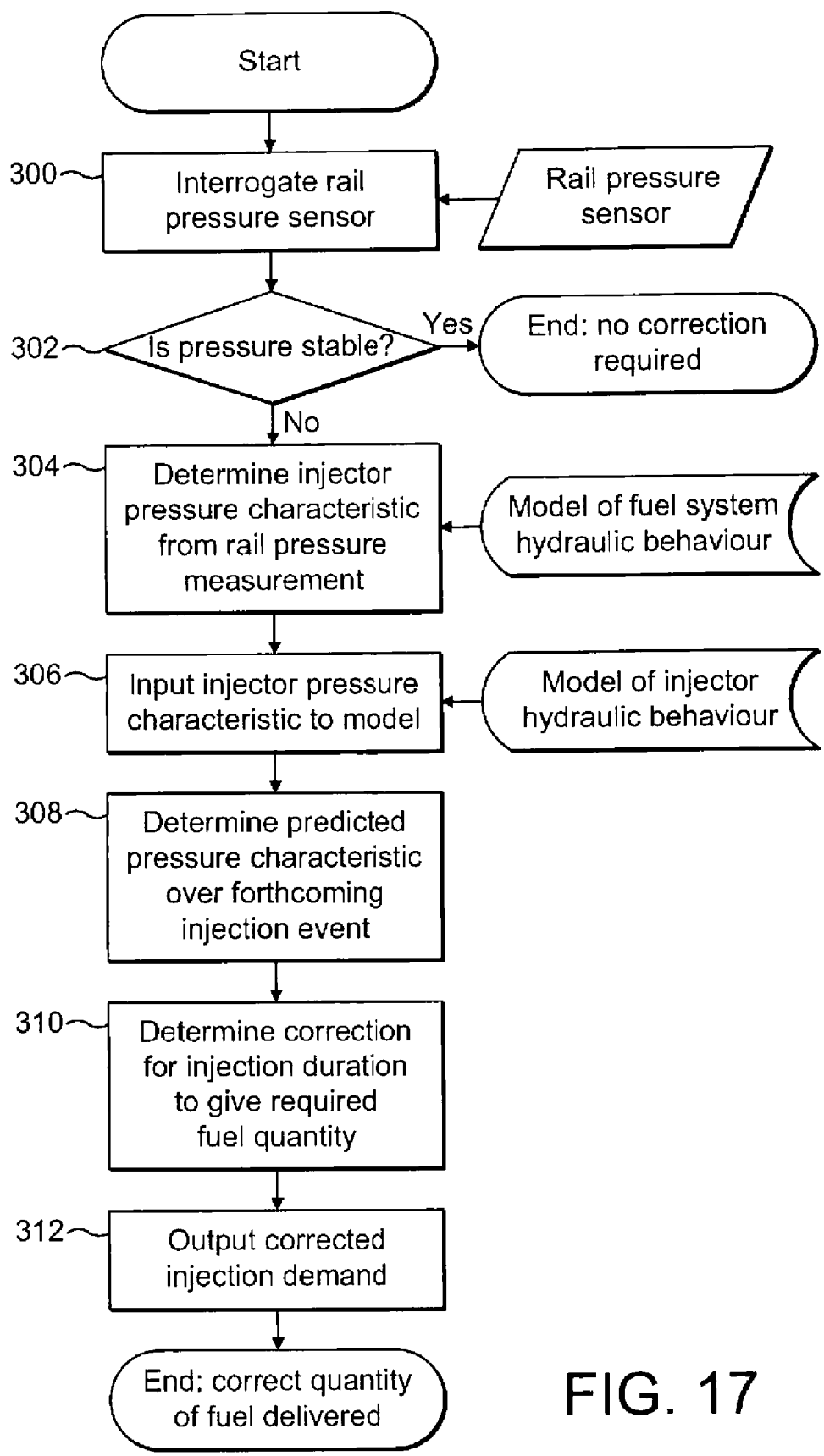
FIG. 17 is a flowchart of an alternative method of fuel injection according to the present invention.
Figure 18:
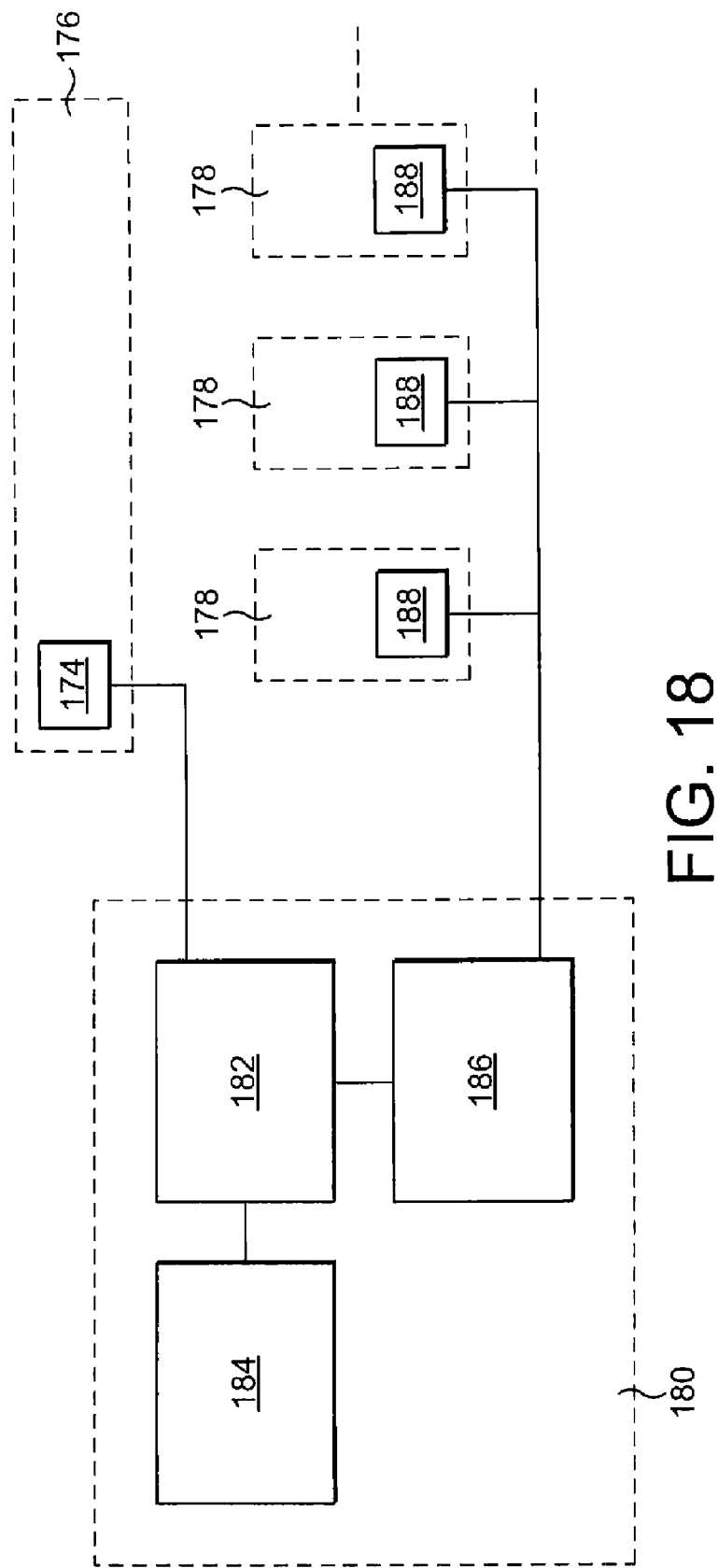
FIG. 18 is a schematic diagram of elements of a fuel injection system, further including a fuel rail fitted with a fuel rail pressure sensor, arranged to perform the method of FIG. 17.

The method for correcting or compensating for pressure perturbations may conceivably be applied to fuel injection systems provided with a rail fuel pressure sensor, instead of or in addition to pressure sensors integrated in the injectors. Thus, a second expression of the method, using only a rail pressure sensor, will now be described with reference to FIG. 17. A system suitable for performing the method of FIG. 17 is shown schematically in FIG. 18, which is similar to the apparatus of FIG. 14 except in that a pressure sensor 174 is provided in the fuel rail 176, and in that the fuel injectors 178 do not include integrated pressure sensors. The ECU 180 receives input signals from the rail pressure sensor 174.

At 300 in FIG. 17, prior to an injection event the rail pressure sensor 174 is interrogated repeatedly to give a sequence of rail fuel pressure values. At 302 in FIG. 17, a processor 182 of the ECU 180 compares the results of each interrogation to determine whether the pressure is stable. If the ECU 180 detects no significant difference between the results of the interrogations, then it is assumed that the impending injection event will not be affected by pressure perturbations and no correction to the injection time is applied.

If, however, the ECU 180 detects a difference between the results of the interrogations, then it is established that a pressure wave is present in the fuel rail 176, which will affect the local fuel pressure within the injectors 178.

A model of the hydraulic behaviour of the fuel system, including the fuel injectors 174 and the fuel rail 176, is stored within a memory 184 of the ECU 180. At 304 in FIG. 17, the results of the interrogations are input to the fuel system hydraulic model to produce estimates of the local pressure within a fuel injector 178, corresponding to the measured rail fuel pressure values.

In addition, a model of the hydraulic behaviour of each injector 178 is stored within the memory 184 of the ECU 180. At 306 in FIG. 17, the estimates of the local pressure within a fuel injector 178, calculated from the rail pressure measurements at 304, are input to the injector hydraulic model to provide, at 308 in FIG. 17, an output comprising a prediction of how the pressure wave will evolve in the fuel injector over the duration of the forthcoming injection event.

If necessary, at 310 in FIG. 17 the ECU 180 applies a correction to the injection duration so as to ensure that the desired quantity of fuel is injected, as in the first embodiment of the method. At 312 in FIG. 17, the required injection time is output to an injector control unit 186 of the ECU 180, which generates an injector control signal. The injector control signal is output to the actuator 188 of a fuel injector 178 to actuate the opening and closing movement of the needle.

In a variant of the method of FIG. 17, the hydraulic behaviours of the fuel system and the fuel injectors are integrated into one model, so that the measured rail fuel pressure values are input to the model, and the output of the model is the predicted pressure wave evolution within the fuel injector.

It will be appreciated that the method is not limited by the location of the pressure sensor or sensors. For example, more than one rail pressure sensor may be provided, so as to generate a more accurate picture of the fuel pressure evolution within the rail for input to the model. Sensors may instead be connected with or provided within the jumper pipes which connect the respective injectors to the fuel rail. Sensors in two or more different locations could be used in combination to provide information to help predict the fuel pressure evolution within the injectors.

When the method utilises measurements from one or more sensors remote from the individual fuel injectors, such as in the second expression of the method, the fuel pressure evolution recorded by the sensor or sensors may result from a combination of pressure waves generated by the fuel injectors, the rail pressure control valve, the high-pressure fuel pump and so on. Therefore, the method may provide for the identification of the contribution to the measured fuel pressure evolution of individual sources of pressure waves. For example, the sensor output may be recorded during periods when no fuel injections take place, such as during engine over-run. The recorded sensor output in these conditions reflects only those pressure waves arising from components other than the fuel injectors. This 'injection-free' output can then be provided as an additional input to the hydraulic model, to allow more accurate determination of the predicted local fuel pressure at the injectors.

The hydraulic models may be implemented in the ECU as algorithms, as look-up tables, or in other suitable forms. The models may be generated using calibration data obtained during testing or manufacture of engines, or may be calculated using computational fluid dynamics techniques.

The invention claimed is:

1. A fuel injection system for an internal combustion engine, the system comprising:
   a plurality of fuel injectors dispensing fuel with multiple injection events during a combustion cycle;
   an accumulator arranged to supply fuel to the fuel injectors;
   a pressure sensor for measuring the pressure of fuel in the accumulator; and
   a control unit arranged to receive a pressure signal from the pressure sensor to construct a hydraulic behavior profile based on a pressure wave characteristic of the plurality of fuel injectors, said hydraulic behavior profile indicative of the fuel pressure that will prevail in an injector dispensing fuel with multiple injection events during a combustion cycle; then when pressure perturbations are detected, to predict, using the pressure signal and the hydraulic behavior profile, the fuel pressure that will prevail in an injector during each injection event; and to supply control signals to that fuel injector to control the amount of fuel injected by each injection event during the combustion cycle in accordance with the predicted fuel pressure.

2. A fuel injection system according to claim 1, wherein the control unit comprises:
   a processor programmed to repeatedly sample the pressure signal from the pressure sensor to construct the hydraulic behavior profile.

3. A fuel injection system according to claim 1, wherein the control unit comprises:
   a memory for storing a hydraulic behavior model; and
   a processor programmed to apply the hydraulic behavior profile to the stored hydraulic behavior model to predict the fuel pressure that will prevail in the injectors during the multiple injection events.

4. A method of fuel injection, comprising:
   constructing a hydraulic behavior profile based on a pressure wave characteristic of the plurality of fuel injectors by fuel pressure measurement, said hydraulic behavior profile indicative of the fuel pressure that will prevail in an injector dispensing fuel with multiple injection events during a combustion cycle;
   when pressure perturbations are detected, using the pressure signal and the hydraulic behavior profile to predict fuel pressure that will prevail in a fuel injector during each injection event; and
   supplying a control signal to the fuel injector to control the amount of fuel injected by each of the multiple injection events during the combustion cycle in accordance with the predicted fuel pressure.

5. A method of fuel injection according to claim 4, wherein the hydraulic behavior profile is constructed by repeatedly sampling fuel pressure.

6. A method of fuel injection according to claim 4, comprising:
   retrieving a stored hydraulic behavior model; and
   applying the hydraulic behavior profile to the stored hydraulic behavior model to predict the fuel pressures that will prevail in the fuel injector during each injection event.

7. A method of fuel injection according to claim 4, comprising
   constructing the hydraulic behavior profile by measuring fuel pressure in an accumulator arranged to supply fuel to a plurality of fuel injectors;
   predicting, using the hydraulic behavior profile, the fuel pressures that will prevail in the plurality of fuel injectors during each of the injection events; and
   controlling the plurality of fuel injectors to control the amount of fuel injected during each of the multiple injection events in accordance with the predicted fuel pressures.

* * * * *